US012777436B2

(12) United States Patent
Ly

(10) Patent No.: US 12,777,436 B2
(45) Date of Patent: Oct. 27, 2026

(54) TRANSMISSION TIMELINES FOR ON-DEMAND SYNCHRONIZATION SIGNAL BLOCKS VIA SECONDARY CELLS

(71) Applicant: QUALCOMM Incorporated, San Diego, CA (US)

(72) Inventor: Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 18/799,887

(22) Filed: Aug. 9, 2024

(65) Prior Publication Data

US 2026/0046791 A1 Feb. 12, 2026

(51) Int. Cl.
*H04W 56/00* (2009.01)
*H04W 52/02* (2009.01)

(52) U.S. Cl.
CPC ..... *H04W 56/001* (2013.01); *H04W 52/0206* (2013.01)

(58) Field of Classification Search
CPC ..... H04W 52/0206
See application file for complete search history.

(56) References Cited

U.S. PATENT DOCUMENTS

2017/0064657 A1* 3/2017 Chendamarai Kannan ..... H04W 16/14
2019/0159148 A1* 5/2019 Jung ..... H04W 56/0005
2020/0163037 A1* 5/2020 Zheng ..... H04L 27/0006
2020/0413356 A1* 12/2020 Wang ..... H04W 74/0808
2021/0007065 A1* 1/2021 Ko ..... H04W 56/00
2021/0058917 A1* 2/2021 Abedini ..... H04B 7/15542

* cited by examiner

*Primary Examiner* — Brenda H Pham
(74) *Attorney, Agent, or Firm* — Holland & Hart LLP

(57) ABSTRACT

Methods, systems, and devices for wireless communications are described. A user equipment (UE) may receive a message indicating a configuration for on-demand synchronization signal block (SSB) bursts associated with a cell, and the UE may further receive (e.g., in the same or different message) an indication that the on-demand SSB bursts will be transmitted via the cell. In such case, the UE may determine a time instance corresponding to a first on-demand SSB of the on-demand SSB bursts associated with the cell. The time instance may be determined based on a time offset value that includes a quantity of time intervals (e.g., symbols, slots) after reception of the message indicating the transmission of the on-demand SSB bursts for the cell. The time offset may be based on a configured value and either a medium access control-control element (MAC-CE) processing time or a procedural delay value.

20 Claims, 15 Drawing Sheets

TRANSMISSION TIMELINES FOR ON-DEMAND SYNCHRONIZATION SIGNAL BLOCKS VIA SECONDARY CELLS

TECHNICAL FIELD

The following relates to wireless communications, including transmission timelines for on-demand synchronization signal blocks via secondary cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by an apparatus is described. The method may include receiving a first message configuring on-demand transmission for one or more synchronization signal block (SSB) bursts associated with a cell, receiving a second message indicating transmission of the one or more SSB bursts associated with the cell, determining, based on a time offset value, a first time instance that corresponds to a first SSB transmitted via the cell, the first SSB is included in an SSB burst of the one or more SSB bursts, where the time offset value includes a quantity of time intervals after a first time interval during which the second message is received, and where the time offset value is based on a first value and at least one of a medium access control-control element (MAC-CE) processing time or a procedural delay value, and receiving the one or more SSB bursts via the cell in accordance with the second message, the first time instance, and the time offset value.

An apparatus for wireless communications is described. The apparatus may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the apparatus to receive a first message configuring on-demand transmission for one or more SSB bursts associated with a cell, receive a second message indicating transmission of the one or more SSB bursts associated with the cell, determine, based on a time offset value, a first time instance that corresponds to a first SSB transmitted via the cell, the first SSB is included in an SSB burst of the one or more SSB bursts, where the time offset value includes a quantity of time intervals after a first time interval during which the second message is received, and where the time offset value is based on a first value and at least one of a MAC-CE processing time or a procedural delay value, and receive the one or more SSB bursts via the cell in accordance with the second message, the first time instance, and the time offset value.

Another apparatus for wireless communications is described. The apparatus may include means for receiving a first message configuring on-demand transmission for one or more SSB bursts associated with a cell, means for receiving a second message indicating transmission of the one or more SSB bursts associated with the cell, means for determining, based on a time offset value, a first time instance that corresponds to a first SSB transmitted via the cell, the first SSB is included in an SSB burst of the one or more SSB bursts, where the time offset value includes a quantity of time intervals after a first time interval during which the second message is received, and where the time offset value is based on a first value and at least one of a MAC-CE processing time or a procedural delay value, and means for receiving the one or more SSB bursts via the cell in accordance with the second message, the first time instance, and the time offset value.

A non-transitory computer-readable medium storing code for wireless communications is described. The code may include instructions executable by one or more processors (e.g., directly, indirectly, after pre-processing, without pre-processing) to receive a first message configuring on-demand transmission for one or more SSB bursts associated with a cell, receive a second message indicating transmission of the one or more SSB bursts associated with the cell, determine, based on a time offset value, a first time instance that corresponds to a first SSB transmitted via the cell, the first SSB is included in an SSB burst of the one or more SSB bursts, where the time offset value includes a quantity of time intervals after a first time interval during which the second message is received, and where the time offset value is based on a first value and at least one of a MAC-CE processing time or a procedural delay value, and receive the one or more SSB bursts via the cell in accordance with the second message, the first time instance, and the time offset value.

In some examples of the method, apparatus, and non-transitory computer-readable medium described herein, the second message includes a MAC-CE and the method, apparatuses, and non-transitory computer-readable medium may include further operations, features, means, or instructions for calculating the time offset value based on a sum of the first value and the MAC-CE processing time.

In some examples of the method, apparatus, and non-transitory computer-readable medium described herein, the time offset value may be further based on a slot associated with a feedback message indicating feedback for the second message and the method, apparatuses, and non-transitory computer-readable medium may include further operations, features, means, or instructions for transmitting the feedback message within the slot, the slot occurring prior to the first time instance corresponding to the first SSB transmitted via the cell, where receiving the one or more SSB bursts via the cell may be based on the feedback message.

In some examples of the method, apparatus, and non-transitory computer-readable medium described herein, the MAC-CE processing time includes a multiple of a quantity of slots per subframe associated with a subcarrier spacing value, the subcarrier spacing value corresponding to an active bandwidth part associated with the second message.

In some examples of the method, apparatus, and non-transitory computer-readable medium described herein, the first time instance includes a first symbol period of the first SSB transmitted via the cell, the first time interval includes a slot in which the second message may be received, and the quantity of time intervals includes a quantity of symbol periods.

In some examples of the method, apparatus, and non-transitory computer-readable medium described herein, the first time instance includes a start of a first slot including the first SSB transmitted via the cell, the first time interval includes a slot in which the second message may be received, and the quantity of time intervals includes a quantity of slots.

In some examples of the method, apparatus, and non-transitory computer-readable medium described herein, the first message configuring on-demand transmission for the one or more SSB bursts further includes a configuration of the first value.

In some examples of the method, apparatus, and non-transitory computer-readable medium described herein, the second message includes a radio resource control message and the method, apparatuses, and non-transitory computer-readable medium may include further operations, features, means, or instructions for calculating the time offset value based on a sum of the first value and the procedural delay value.

In some examples of the method, apparatus, and non-transitory computer-readable medium described herein, receiving the second message may include operations, features, means, or instructions for receiving the second message via a physical downlink shared channel, where the first time interval corresponds to a slot during which the physical downlink shared channel may be received.

In some examples of the method, apparatus, and non-transitory computer-readable medium described herein, receiving the second message may include operations, features, means, or instructions for receiving the second message via a physical downlink control channel, the second message further including an uplink grant for transmitting a response message, where the first time interval corresponds to a slot during which the physical downlink control channel may be received.

In some examples of the method, apparatus, and non-transitory computer-readable medium described herein, the time offset value may be further based on a quantity of slots per subframe associated with a subcarrier spacing value, the subcarrier spacing value corresponding to a bandwidth part associated with the first message configuring the on-demand transmission for the one or more SSB bursts.

In some examples of the method, apparatus, and non-transitory computer-readable medium described herein, the first time instance includes a first symbol period of the first SSB transmitted via the cell and the quantity of time intervals includes a quantity of symbol periods.

In some examples of the method, apparatus, and non-transitory computer-readable medium described herein, the first time instance includes a start of a first slot including the first SSB transmitted via the cell and the quantity of time intervals includes a quantity of slots.

Some examples of the method, apparatus, and non-transitory computer-readable medium described herein may further include operations, features, means, or instructions for determining a second time instance at which the one or more SSB bursts end transmission via the cell, the second time instance including a second time interval in which a deactivation message may be received, where the deactivation message indicates that the cell may be deactivated.

Some examples of the method, apparatus, and non-transitory computer-readable medium described herein may further include operations, features, means, or instructions for receiving a deactivation message including an indication that the cell may be deactivated and determining a second time instance at which the one or more SSB bursts end transmission via the cell, the second time instance including a second time interval in which a feedback message including an acknowledgment of the deactivation message may be transmitted.

Some examples of the method, apparatus, and non-transitory computer-readable medium described herein may further include operations, features, means, or instructions for determining a second time instance at which the one or more SSB bursts end transmission via the cell, the second time instance including a second time interval in which a channel state information report may be transmitted, the channel state information report being based on an activation of the cell.

Some examples of the method, apparatus, and non-transitory computer-readable medium described herein may further include operations, features, means, or instructions for receiving, after the first time instance, a third message indicating a termination of the one or more SSB bursts associated with the cell, where the one or more SSB bursts stop after the third message may be received in accordance with the termination of the one or more SSB bursts, and where the third message may be received form a primary cell or a secondary cell.

In some examples of the method, apparatus, and non-transitory computer-readable medium described herein, the first value may be based on an active bandwidth part associated with the second message.

In some examples of the method, apparatus, and non-transitory computer-readable medium described herein, the first message or the second message, or both, may be received from a primary cell or a secondary cell.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
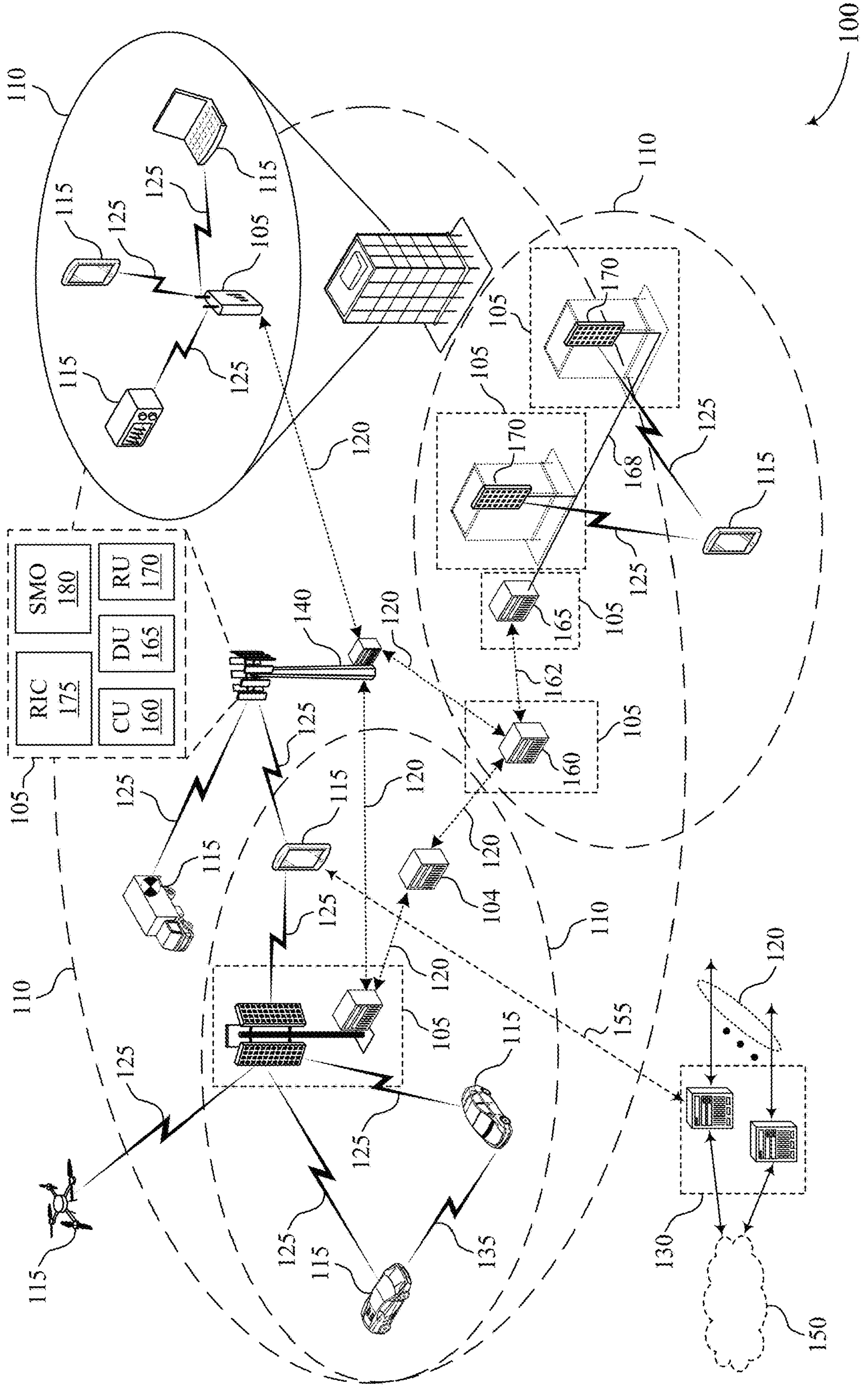
FIG. 1 shows an example of a wireless communications system that supports transmission timelines for on-demand synchronization signal blocks (SSBs) via secondary cells in accordance with one or more aspects of the present disclosure.

Some wireless communications systems may implement techniques for the transmission of on-demand SSBs (SSBs) to enable various power saving measures. For instance, one or more cells (e.g., secondary cells (SCells)) associated with one or more network entities may refrain from transmitting SSBs, thereby enabling various power saving techniques for the one or more cells (e.g., enabling microsleep or other techniques that are possible with an absence of signaling). In some examples, on-demand SSBs may be used for an SCell when a user equipment (UE) is configured with carrier aggregation, and the UE may be made aware of one or more instances of the on-demand SSB transmissions in response to an indication from the network. In such cases, the UE may receive and measure the on-demand SSBs transmitted via the SCell after receiving the indication for the cell, where the on-demand SSBs may be transmitted for some duration, for example, until SCell activation is completed or for some other duration. However, the time at which the on-demand SSB transmissions via the SCell begins for the UE on the SCell may not be defined, and techniques that enable the UE to determine the start time of such on-demand SSB transmissions, as well as when the on-demand SSB transmissions may stop, may be needed.

The techniques described herein enable a UE to determine when a first on-demand SSB of one or more on-demand SSB bursts is transmitted via a cell (e.g., an SCell) after receiving an indication of the on-demand SSB transmission. For example, the UE may receive, via medium access control-control element (MAC-CE) signaling, an indication of the transmission of on-demand SSBs for the SCell. The first time instance (which may be referred to as "time instance A") may correspond to the first on-demand SSB of the one or more on-demand SSB bursts on the cell and may be the first time interval (e.g., symbol, slot) of the first actually transmitted SSB of an on-demand SSB burst. The first time instance may be some time offset (e.g., T) after the time interval (e.g., slot) where the UE received the MAC-CE signaling indicating the on-demand SSB transmission. Here, the time offset, T, may be calculated based on multiple values, including a first value (e.g., $\Delta_{MAC\text{-}CE}$) and a MAC-CE processing time (e.g., $T_0$). In some aspects, the first value $\Delta_{MAC\text{-}CE}$ may be configured via one or more messages (e.g., radio resource control (RRC) messages) that indicate a configuration of the on-demand SSBs.

Additionally, or alternatively, the UE may receive the indication of the transmission of the on-demand SSB bursts for the cell via RRC signaling. The UE may determine the first time instance (e.g., "time instance A") based on the time offset, T, and the time interval (e.g., slot) in which the RRC signaling was received, or based on the time offset and the time interval in which the UE receives control signaling (e.g., via a physical downlink control channel (PDCCH)) providing an uplink grant. The time offset, T, may be calculated based on a first value (e.g., $\Delta_{RRC}$) and a procedural delay value (e.g., $T_{RRC\ procedure\ delay}$), where the first value $\Delta_{RRC}$ may be indicated via one or more messages that configure the on-demand SSB bursts.

In some examples, a second time instance (e.g., "time instance B") may correspond to the end of the on-demand SSB burst transmissions via the cell. In such cases, the second time instance may correspond to the time that the UE receives a command (e.g., a deactivation command) that indicates that the on-demand SSBs are unavailable for a cell (e.g., after being deactivated for the cell), which may be based on a bit value signaled to the UE, such as a bit flag having a value of 0 or 1. Additionally, or alternatively, the second time instance may correspond to the time that the UE receives a command (e.g., a deactivation command) that indicates that the cell is being deactivated. In some examples, the second time instance may correspond to the time instance the UE transmits a feedback message (e.g., HARQ-ACK) in response to the command indicating that the cell is being deactivated (e.g., made unavailable) or indicating deactivation of the on-demand SSB transmissions (e.g., indicating that the on-demand SSB transmissions are unavailable). In other examples, the second time instance may be the time at which the UE completes SCell activation (e.g., the UE transmits a channel quality indicator (CQI) report after receiving signaling that activates the SCell (e.g., making the SCell available)).

Aspects of the disclosure are initially described in the context of wireless communications systems. Further examples are described with reference to on-demand SSB transmission schemes, transmission timelines for on-demand SSBs, and process flows. Aspects of the disclosure are further illustrated by and described with reference to apparatus diagrams, system diagrams, and flowcharts that relate to transmission timelines for on-demand SSBs via secondary cells.

FIG. 1 shows an example of a wireless communications system 100 that supports transmission timelines for on-demand SSBs via secondary cells in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. In carrier aggregation, a UE 115 may communicate via one primary cell (PCell) that supports signaling of uplink and/or downlink data, as well as control information for the UE 115. The UE 115 may also optionally communicate via one or more secondary cells (SCells) that carry uplink and/or downlink data. In some aspects, a PCell may operate in a relatively lower carrier frequency than the one or more SCells. SCells may be configured and activated and/or deactivated via RRC signaling sent to a UE 115.

Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. Thus, In an aspect, techniques disclosed herein may be applicable to MTC or IoT UEs 115. MTC or IoT UEs 115 may include MTC/enhanced MTC (eMTC, also referred to as CAT-M, Cat M1) UEs 115, NB-IOT (also referred to as CAT NB1) UEs 115, as well as other types of UEs 115. eMTC and NB-IOT may refer to future technologies that may evolve from or may be based on these technologies. For example, eMTC may include further eMTC (FeMTC), enhanced further eMTC (eFeMTC), and massive MTC (mMTC), and NB-IoT may include enhanced NB-IOT (eNB-IOT) and further enhanced NB-IOT (FeNB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 attempting to access a wireless network may perform an initial cell search by detecting a primary synchronization signal (PSS) from a network entity 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, a network entity 105 may transmit synchronization signals (e.g., PSS, SSS) using multiple beams in a beam-sweeping manner through a cell coverage area. In some cases, PSS, SSS, and/or broadcast information (e.g., a physical broadcast channel (PBCH)) may be transmitted within respective synchronization signal blocks (SSBs) in respective directional beams, where one or more SSBs may be included within a burst. That is, an SSB may include PSS, SSS, and/or PBCH, and one or more SSBs may be included within an SSB burst.

After receiving the PSS and SSS, the UE 115 may receive a master information block (MIB), which may be transmitted via the PBCH. The MIB may contain system bandwidth information, a system frame number (SFN), and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

In some cases, a UE 115 may be served by cells from two or more network entities 105 using a dual connectivity operation. In some examples, respective network entities 105 included in the dual connectivity configuration may have a non-ideal backhaul link between each other. For example, the connection between the serving network entities 105 may not be sufficient to facilitate precise timing coordination. Thus, in some cases, the cells serving a UE 115 may be divided into multiple tracking area groups (TAGs). Each TAG may be associated with a different timing offset, such that the UE 115 may synchronize uplink transmissions differently for different uplink carriers.

The wireless communications system 100 may support techniques that enable one or more UEs 115 to identify start and/or stop times for on-demand SSB bursts transmitted via a cell (e.g., an SCell). For example, a UE 115 may receive, from a PCell or an SCell, a message indicating a configuration of one or more on-demand SSB bursts associated with a cell (e.g., an SCell of one or more SCells). In some examples, there may be one or multiple on-demand SSB configurations indicated to the UE 115 from the PCell or the SCell, where each configuration indicates one or more sets of parameters associated with the transmission of on-demand SSB bursts, such as one or more values associated with the start and/or stop of on-demand SSB bursts for a cell. The UE 115 may further receive, from the PCell or the SCell (e.g., via the same message or via a different message), an indication that the one or more on-demand SSB bursts will be transmitted via the cell. For example, the indication may provide an indication of the availability of (or, in some cases, the unavailability of) on-demand SSB transmission, and the indication may further provide updates to one or more parameters associated with on-demand SSB transmissions (such as a periodicity of on-demand SSB transmissions, SSB positions within an on-demand SSB burst, or the like). In such cases, the UE 115 may determine a time instance corresponding to a first on-demand SSB of the on-demand SSB bursts associated with the cell. The time instance may be determined based on a time offset value (e.g., T) that includes a quantity of time intervals (e.g., symbols, slots) after reception of the message indicating the transmission of the on-demand SSB bursts for the cell, a frequency of the first on-demand SSB (e.g., in terms of an absolute radio-frequency channel number (ARFCN)), an indication of SSB positions within an on-demand SSB burst that are transmitted, a periodicity of the on-demand SSB or any combination thereof.

As one example, the time instance (e.g., "time instance A") corresponding to the first SSB may be the first symbol period of the first actually transmitted SSB of an on-demand SSB burst, which may be T symbol periods after the slot where UE receives the indication from the PCell or SCell indicating the on-demand SSB transmissions. Additionally, or alternatively, the time instance corresponding to the first SSB may be the beginning of a slot (e.g., a slot boundary, a first OFDM symbol of the slot) including the first actually transmitted SSB of an on-demand SSB burst, which may be T slots after the slot where UE receives the indication from the PCell or SCell indicating the on-demand SSB transmissions.

In another example, such as when the indication of the SSB burst transmissions is received by the UE 115 via RRC signaling, the UE 115 may determine that the first SSB may correspond to the first symbol of the first actually transmitted SSB of the one or more on-demand SSB bursts, which may be T symbols after the slot where the UE 115 receives signaling (e.g., via a physical downlink shared channel (PDSCH)) indicating the on-demand SSB burst transmissions. In some cases, the UE 115 may determine that the first SSB may correspond to the first symbol of the first actually transmitted SSB of the one or more on-demand SSB bursts, which may be T symbols after the slot where the UE 115 receives control signaling (e.g., via PDCCH) that indicates an uplink grant (e.g., to transmit feedback to the network). Additionally, or alternatively, the UE 115 may determine that the first SSB corresponds to the beginning of the slot including the first actually transmitted SSB of the one or more on-demand SSB bursts, which may be T slots after the slot where the UE 115 receives signaling (e.g., via PDSCH) indicating the on-demand SSB burst transmissions. In some aspects, the UE 115 may determine that the first SSB corresponds to the beginning of the slot including the first actually transmitted SSB of the one or more on-demand SSB bursts, which may be T slots after the slot where the UE 115 receives the control signaling (e.g., via PDCCH) indicating the uplink grant.

In any case, the time offset, T, may be calculated based on a configured value (e.g., $\Delta_{MAC\text{-}CE}$, $\Delta_{RRC}$) and at least one of a MAC-CE processing time (e.g., $T_0$) or a procedural delay value (e.g., $T_{RRC\ procedure\ delay}$). In some examples, the time offset, T, may be calculated based on a configured value (e.g., $\Delta_{MAC\text{-}CE}$, $\Delta_{RRC}$) and either the MAC-CE processing time (e.g., To) or the procedural delay value (e.g., $T_{RRC\ procedure\ delay}$). Using the start time (e.g., time instance A) of the one or more on-demand SSB bursts, the UE 115 may expect that on-demand SSBs are periodically transmitted from the determined time instance until the one or more on-demand SSB bursts stop on the cell. The one or more on-demand SSB bursts may stop at a time instance that corresponds to a time that the UE 115 receives a command to deactivate the cell (e.g., deactivate the SCell). In other examples, one or more on-demand SSB bursts may stop transmission on the cell at a time instance that corresponds to a time that the UE 115 successfully completes cell activation (e.g., transmits a report, such as a CSI report, after receiving an SCell activation command). In some cases, the end of the one or more on-demand SSB transmissions may end based on signaling received by the UE 115 from the PCell or the SCell.

Figure 2:
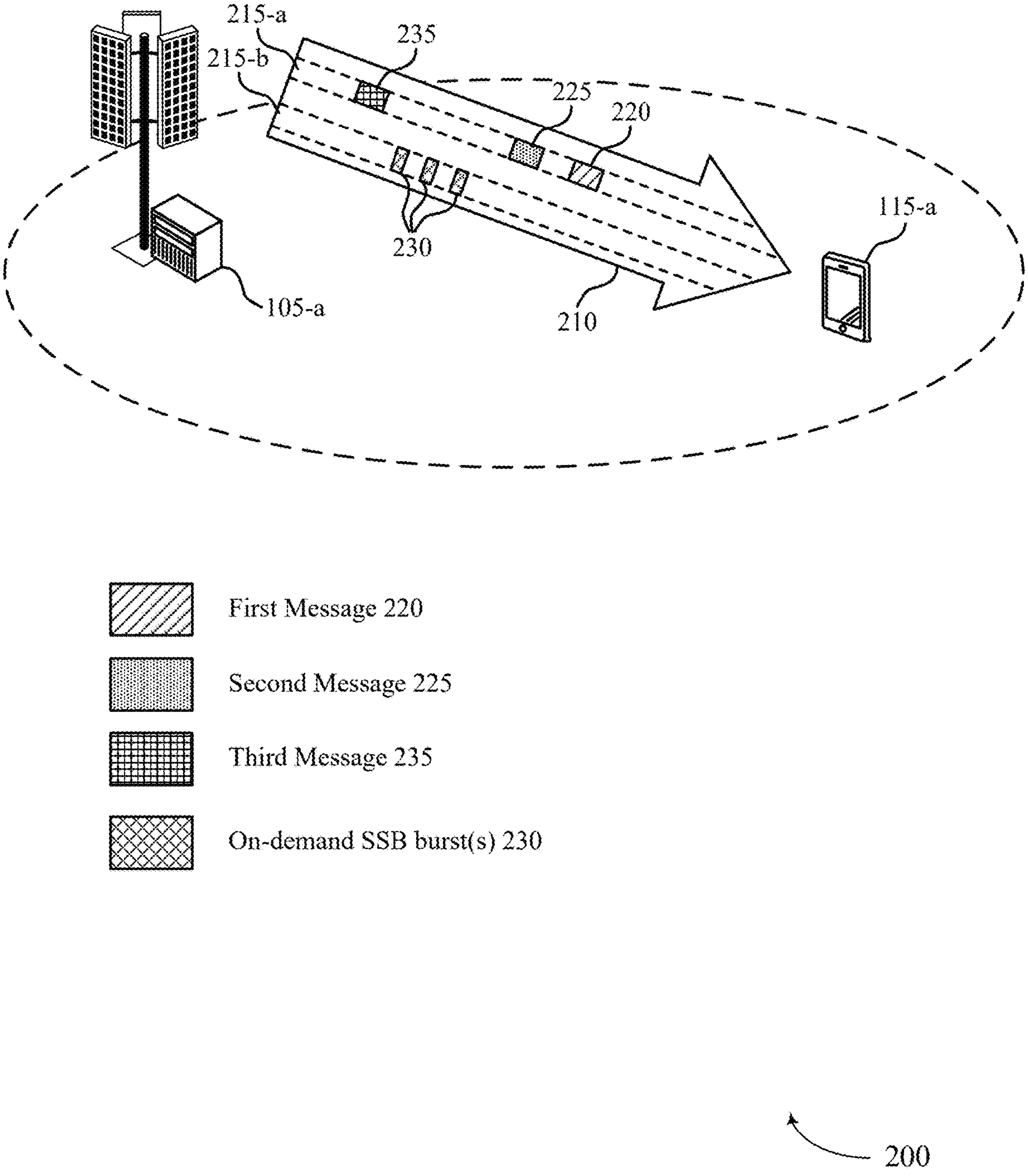
FIG. 2 shows an example of a wireless communications system that supports transmission timelines for on-demand SSBs via secondary cells in accordance with one or more aspects of the present disclosure.

FIG. 2 shows an example of a wireless communications system 200 that supports transmission timelines for on-demand SSBs via secondary cells in accordance with one or more aspects of the present disclosure. The wireless communications system 200 includes a network entity 105-*a* and a UE 115-*a*, which may represent examples of a network entity 105 and a UE 115, respectively, as described with reference to FIG. 1. The network entity 105-*a* and the UE 115-*a* may communicate within a geographic coverage area and via a communication link 210 (e.g., a Uu link). In some examples, the UE 115-*a* and the network entity 105-*a* may communicate using carrier aggregation, where uplink and/or downlink communications may be sent via a first component carrier 215-*a* associated with a PCell. Further, uplink and/or downlink communications may be sent via one or more component carriers associated with an SCell, such as the component carrier 215-*b*. In some aspects, multiple SCells may be configured for the carrier aggregation operation.

The wireless communications system 200 may support on-demand SSB operation in one or more cells, where the network entity 105-*a* may configure on-demand transmissions of SSBs (e.g., on-demand SSB bursts 230) for the one or more SCells. Here, on-demand SSB bursts 230 may be supported in one or more SCells for connected mode UEs 115 (e.g., including the UE 115-*a*) that are configured with carrier aggregation (e.g., intra-band carrier aggregation, intra-band carrier aggregation). The on-demand SSB transmissions may be triggered at the network entity 105-*a* via various techniques including, for example, an uplink wake-up-signal, cell on/off indications, SCell activation and/or deactivation signaling, among other examples. Further, the on-demand SSB burst 230 transmissions may be used by the UE 115-*a* for SCell time and/or frequency synchronization, L1/L3 measurements, and/or SCell activation, among other examples. On-demand SSB operations may be supported for FR1 and FR2. In any case, on-demand SSB operation may enable improved network energy savings and other benefits in the wireless communications system 200.

In some aspects, when and/or how the network entity 105-*a* triggers the on-demand SSB transmissions may be transparent to the UE 115-*a*. However, the UE 115-*a* may receive an indication of when the UE 115-*a* may expect the on-demand SSB transmission via the SCell. As an example, the UE 115-*a* may receive a first message 220 that indicates a configuration of on-demand transmission for one or more SSB bursts 230 associated with the SCell. In some aspects, the first message 220 indicating the on-demand SSB configuration may be an RRC message, and the first message 220 may be transmitted to the UE 115-*a* from the PCell or an SCell, or both. In some examples, the configuration of the on-demand SSB burst 230 transmissions may include an indication of a frequency associated with the on-demand SSB transmissions, an indication of respective SSB positions within an on-demand SSB burst 230 (e.g., including higher-layer signaling indicating SSB positions in a burst), an indication of a periodicity of the on-demand SSBs (or a periodicity of the one-demand SSB bursts 230), some other parameters associated with the on-demand SSB transmissions, or any combination thereof.

In some cases, the UE 115-*a* may receive, from the network entity 105-*a*, a second message 225 indicating that the network entity is transmitting the one or more SSB bursts via the SCell. That is, receiving the configuration of the on-demand SSB bursts 230 via the first message 220 may not mean that the on-demand SSB bursts 230 are transmitted to the UE 115-*a* at the same time the configuration is received. Thus, an additional indication may be used to inform the UE 115-*a* of the transmission of on-demand SSB bursts 230. In some examples, the second message including the indication of the on-demand SSB transmission may be transmitted from the PCell or from an SCell, or both. In some aspects, the cell transmitting the configuration of the one or more on-demand SSB bursts 230 (e.g., via the first message 220) may be the cell sending the indication of the on-demand SSB burst 230 transmissions (e.g., via the second message 225). The second message 225 may include an indication of the availability of (or, in some cases, the unavailability of) on-demand SSB transmission, as well as one or more changes to parameters associated with on-demand SSB transmissions (such as a periodicity of on-demand SSB transmissions, SSB positions within an on-demand SSB burst 230, or the like). Further, the second message 225 may be transmitted via RRC signaling or via MAC-CE signaling, or both. In some examples, when the second message 225 is transmitted via RRC signaling, the indication that the on-demand SSB bursts 230 are being transmitted may be sent with the configuration of the on-demand SSB bursts 230. Put another way, the first message 220 and the second message 225 may be included together in the same signaling (e.g., a same RRC message) received by the UE 115-*a*.

Thus, for a cell supporting on-demand SSB SCell operation, RRC-based signaling may be supported for indicating the on-demand SSB transmissions on the cell. Additionally, or alternatively, MAC-CE-based signaling may be supported for indicating the on-demand SSB burst 230 transmissions on the cell. In some examples, DCI-based signaling may be supported for the indication of the on-demand SSB transmissions on the cell.

For the one or more on-demand SSB bursts 230 indicated for the on-demand SSB operation (e.g., on the SCell), the UE 115-*a* may expect that one or more on-demand SSB bursts are periodically transmitted from a first time instance (which, in some examples, may be referred to as "time instance A" or some other terminology). For example, the UE 115-*a* may expect that the one or more on-demand SSB bursts 230 are periodically transmitted from the first time instance until the on-demand SSB bursts 230 are stopped (e.g., turned off by the network entity 105-*a*). In another example, the UE 115-*a* may expect that the one or more on-demand SSB bursts 230 are transmitted from the first time instance until another, second time instance occurring after the first time instance (which, in some examples, may be referred to as "time instance B" or some other terminology). In such cases, the UE 115-*a* may expect that on-demand SSB burst(s) 230 are not transmitted after the second time instance. Additionally, or alternatively, the UE 115-*a* may expect that the one or more on-demand SSB bursts 230 are transmitted some quantity of times (e.g., N times) after the first time instance and not transmitted after N on-demand SSB bursts 230 are transmitted. In some other examples, the UE 115-*a* may expect that that the one or more on-demand SSB bursts 230 are transmitted with a periodicity from the first time instance until the second time instance, and then with a different periodicity after the second time instance.

However, both the first time instance, corresponding to when the one or more on-demand SSB bursts 230 begin transmission via the SCell, and the second time instance, corresponding to when the on-demand SSB transmissions stop on the SCell, may not be defined. Without such definitions, determining when the on-demand SSB transmissions are to be received may be challenging and may introduce some inefficiencies for the UE 115-*a*. Thus, techniques that enable the UE 115-*a* to determine the start time of such on-demand SSB transmissions, as well as when the on-demand SSB transmissions may stop, may be needed.

The wireless communications system 200 may support techniques to enable the UE 115-*a* to determine when a first on-demand SSB of one or more on-demand SSB bursts 230 is transmitted via a cell (e.g., the SCell) after receiving an indication of the on-demand SSB transmission. For example, when the UE 115-*a* receives the second message 225 (e.g., indication of the transmission of the on-demand SSB bursts for the SCell) via MAC-CE signaling, an indication of the transmission of on-demand SSB bursts 230 for the SCell. The first time instance may correspond to the first on-demand SSB of the one or more on-demand SSB bursts 230 on the cell and may be the first time interval (e.g., symbol, slot) of the first actually transmitted SSB of an on-demand SSB burst 230. The first time instance may be some time offset (e.g., T) after the time interval (e.g., slot) where the UE 115-*a* received the MAC-CE signaling indicating the on-demand SSB transmission. Here, the time offset, T, may be calculated based on multiple values, including a first value (e.g., $\Delta_{MAC\text{-}CE}$) and a MAC-CE processing time (e.g., To). The MAC-CE processing time may be an amount of time (e.g., a duration) that UE 115-*a* uses to decode a PDSCH carrying the second message 225 (e.g., a MAC-CE) and process MAC-CE information. In some aspects, the first value $\Delta_{MAC\text{-}CE}$ may be configured via one or more messages (e.g., radio resource control (RRC) messages) that indicate a configuration of the on-demand SSB bursts 230.

Additionally, or alternatively, such as when the UE 115-*a* receives the second message 225 (e.g., indication of the transmission of the on-demand SSB bursts for the SCell) via the RRC signaling, the UE 115-*a* may determine the first time instance based on the time offset, T, and the time interval (e.g., slot) in which the RRC signaling was received, or based on the time offset T and a time interval in which the UE 115-*a* receives control signaling (e.g., via a physical downlink control channel (PDCCH)) providing an uplink grant for the UE 115-*a*. The time offset, T, may be calculated based on a first value (e.g., $\Delta_{RRC}$) and a procedural delay value (e.g., $T_{RRC\ procedure\ delay}$), where the first value $\Delta_{RRC}$ may be indicated via the first message 220 that configures the on-demand SSB bursts 230.

In some examples, a second time instance (e.g., "time instance B") may correspond to the end of the on-demand SSB burst transmissions via the SCell. In such cases, the second time instance may correspond to the time that the UE 115-*a* receives a command (e.g., a deactivation command) that indicates that the on-demand SSB bursts 230 are being deactivated for the cell. Additionally, or alternatively, the second time instance may correspond to the time instance the UE 115-*a* transmits a feedback message (e.g., HARQ-ACK) in response to the command indicating deactivation of the on-demand SSB transmissions. In other examples, the second time instance may be the time at which the UE 115-*a* completes SCell activation.

In some aspects, an indication that the one or more on-demand SSB bursts 230 are ending transmission (e.g., are stopped on the SCell) may be indicated to the UE 115-*a* using the same or similar signaling as is used to indicate the start of the on-demand SSB burst transmissions. That is, a third message 235, which may be similar to the second message (e.g., MAC-CE signaling, RRC signaling), may be used to terminate transmission of the on-demand SSB burst(s) 230. In such examples, the indication may comprise a bit value (e.g., a bit flag) indicating whether the one or more on-demand SSB bursts are transmitted (such as a bit value 0 indicating that the on-demand SSB burst(s) 230 are not transmitted, a bit value 1 indicating that the on-demand SSB burst(s) 230 are transmitted). Accordingly, after the first time instance (e.g., time instance A) when on-demand SSB transmission begin on the SCell, if the UE 115-*a* receives the third message 235 for the SCell with an additional indication that the on-demand SSB bursts 230 are not transmitted (e.g., with bit 0), the UE 115-*a* may determine (e.g., assume) that the on-demand SSBs will no longer be transmitted N slots and/or symbols after the time the UE 115-*a* receives the third message 235 including the indication.

Figure 3A:
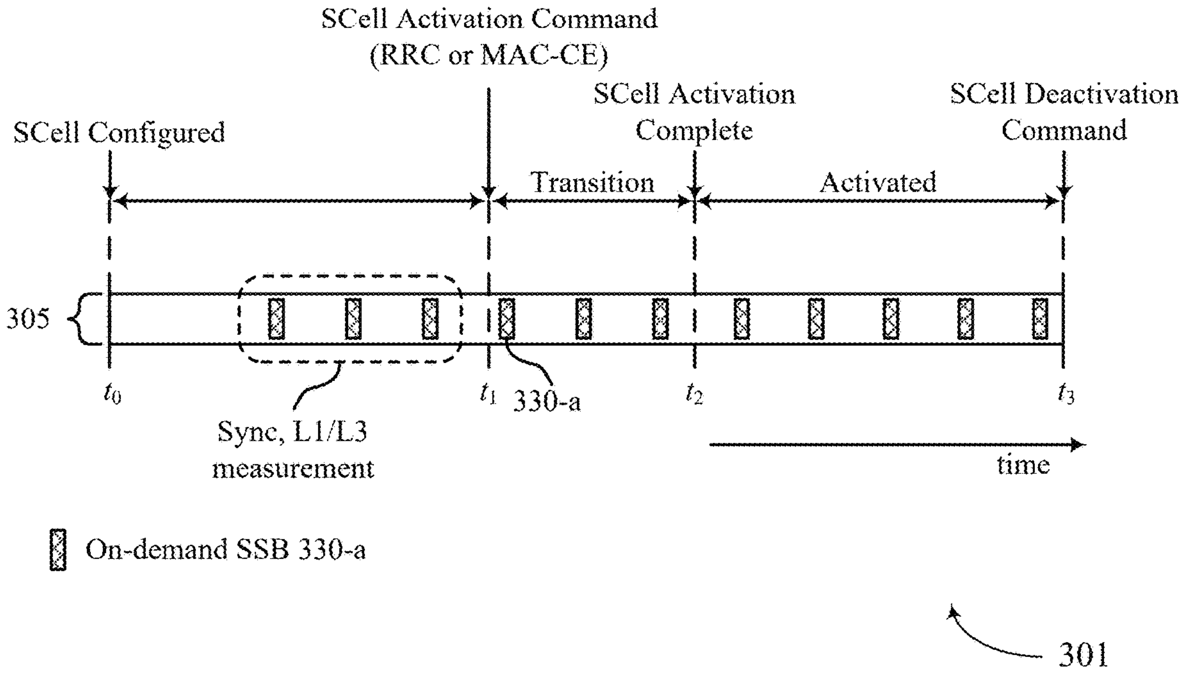
FIGS. 3A and 3B show examples of on-demand SSB transmission schemes that support transmission timelines for on-demand SSBs via secondary cells in accordance with one or more aspects of the present disclosure.
Figure 3B:
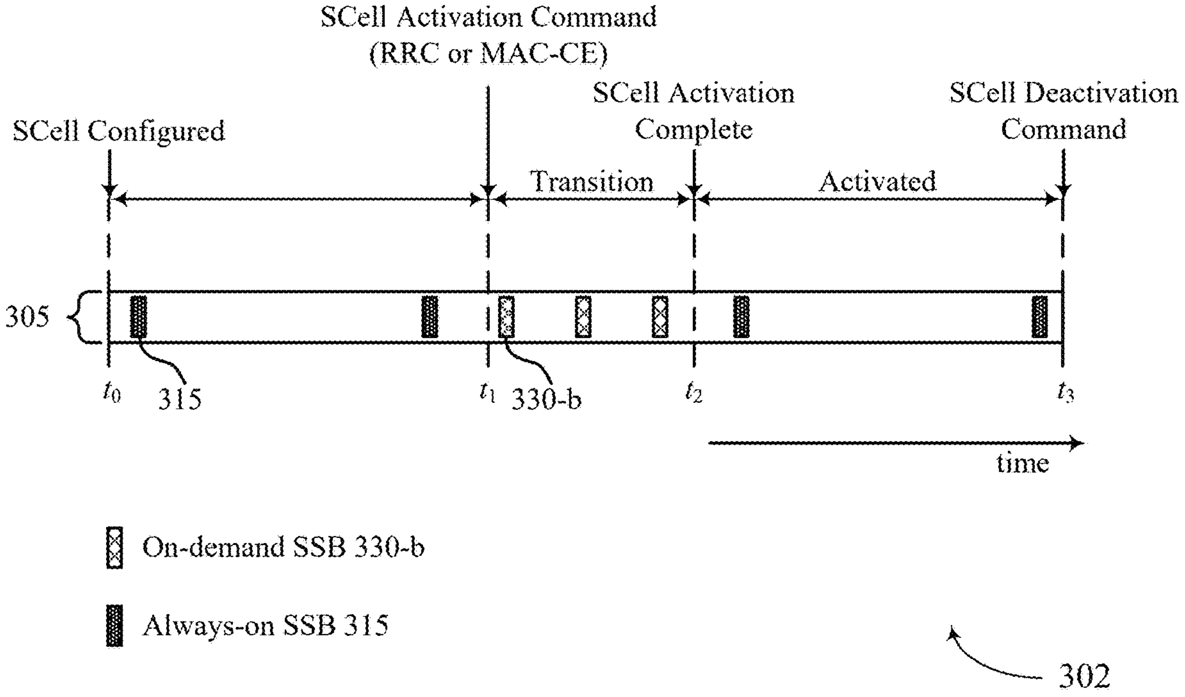
Figure 4A:
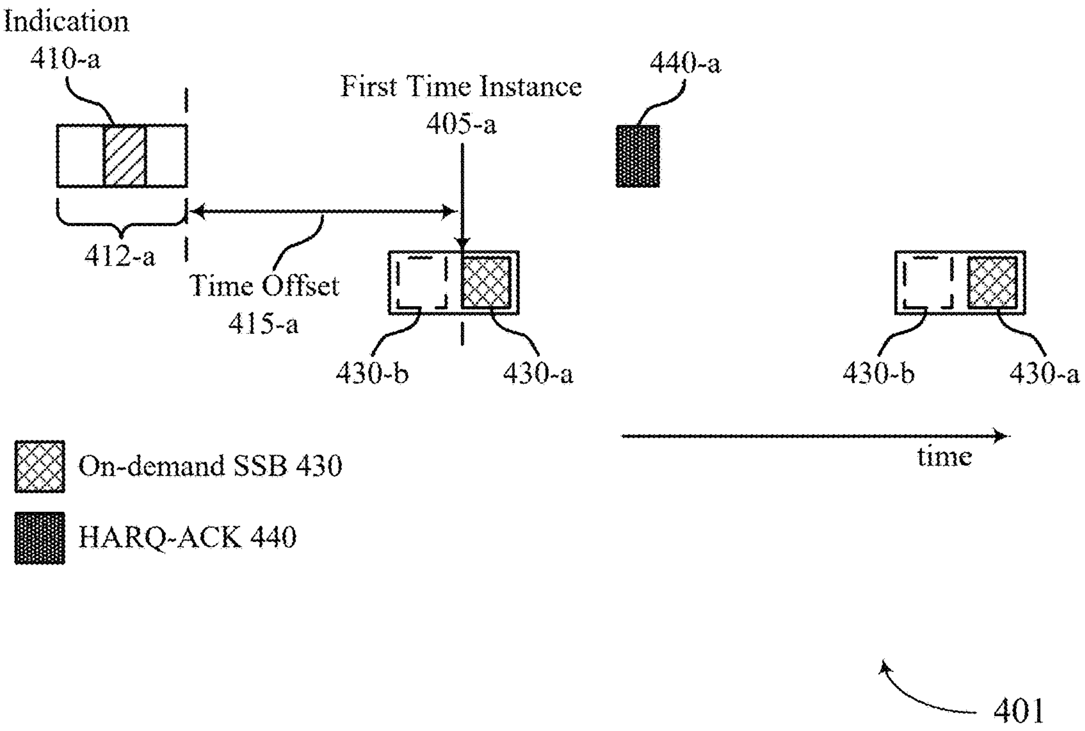
FIGS. 4A, 4B, 4C, and 4D show examples of on-demand SSB transmission timelines that support transmission timelines for on-demand SSBs via secondary cells in accordance with one or more aspects of the present disclosure.
Figure 4B:
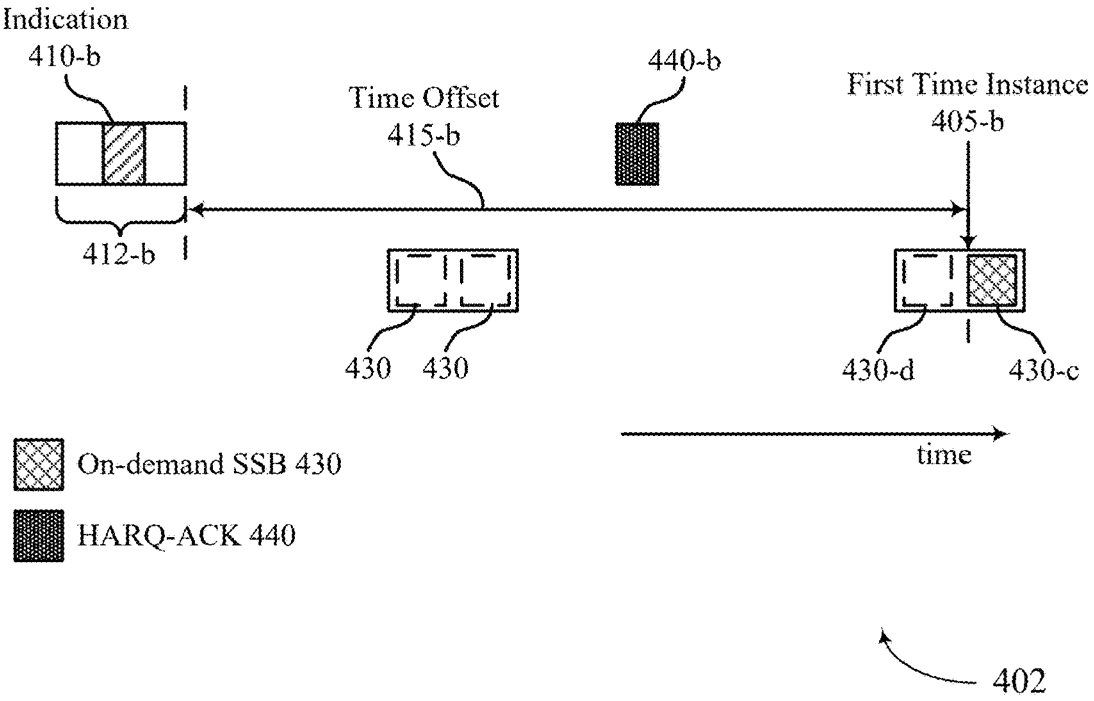
Figure 4C:
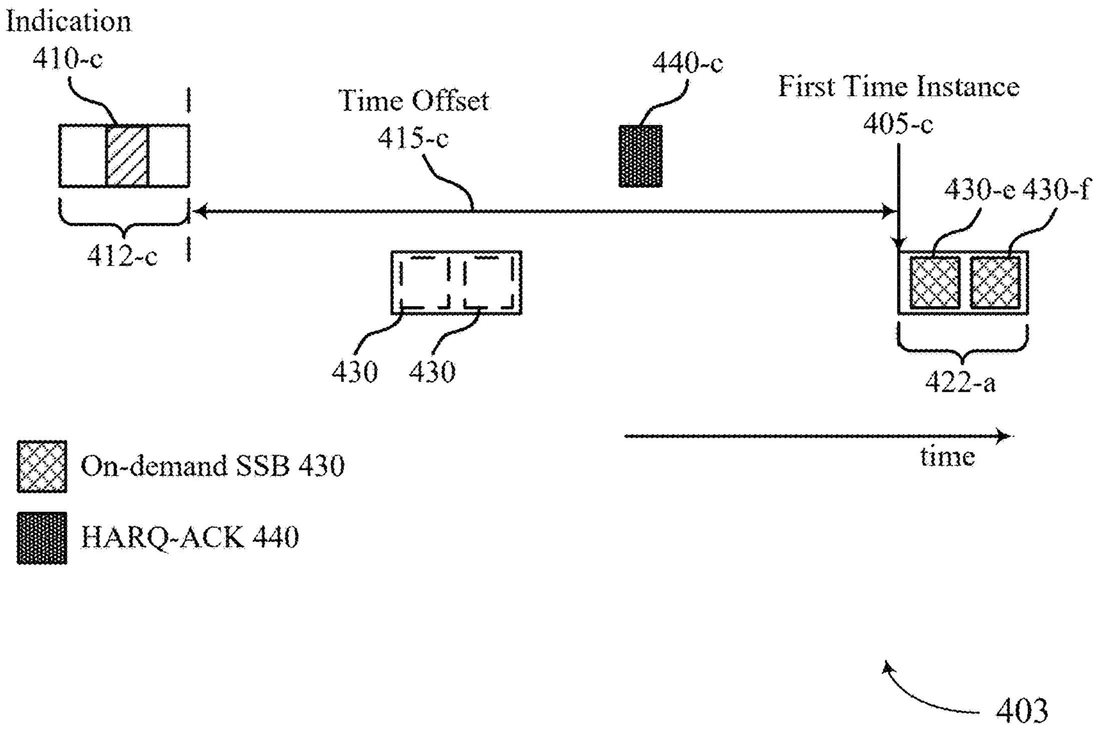
Figure 4D:
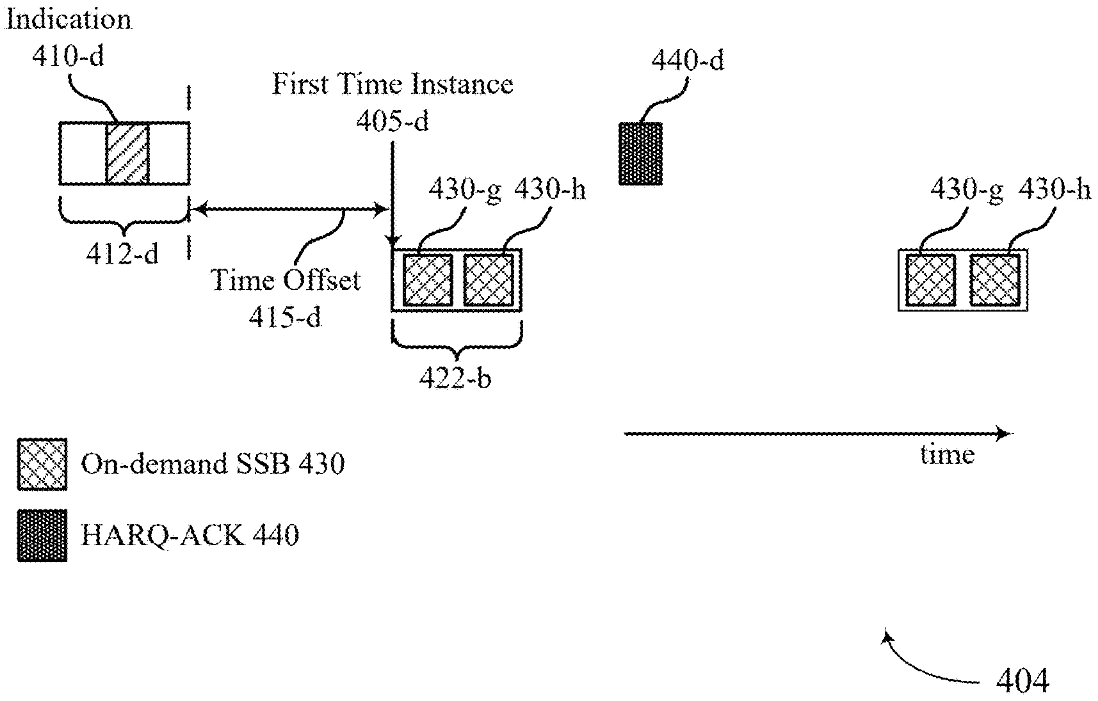

FIGS. 3A and 3B show examples of on-demand SSB transmission schemes 301 and 302, respectively, that support transmission timelines for on-demand SSBs via secondary cells in accordance with one or more aspects of the present disclosure. In some examples, each of the on-demand SSB transmission schemes 301 and 302 may implement or be implemented by aspects of the wireless communications systems 100 and 200. For example, the on-demand SSB transmission schemes 301 and 302 may represent example implementations in which always-on SSBs are used with on-demand SSBs, and which are transmitted from a network entity to a UE. The UE and the network entity may represent examples of corresponding devices, as described with reference to FIGS. 1 and 2.

As described herein, on-demand SSB transmissions may support improved power saving, and the techniques described herein may enable one or more UEs 115 to identify a starting time for on-demand SSB transmissions via a cell (e.g., an SCell). As such, there may be a relatively limited transmission of the on-demand SSB bursts 330 on one or more SCells to enable power saving techniques. In some cases, there may be various schemes in which one or more always-on (e.g., periodic) SSBs 315 may be transmitted (or not) via the SCell for supporting on-demand SSB operation. Here, an always-on SSB 315 may refer to SSBs having a different configuration than on-demand SSBs. For instance, transmission of the always-on SSBs be associated with a different periodicity relative to the on-demand SSB bursts 330, among other examples. When present for an SCell, the always-on SSBs 315 may be continually transmitted via the SCell in accordance with some periodicity.

In the on-demand SSB transmission scheme 301, and as illustrated in FIG. 3A, there may not be a transmission of the always-on SSBs via the SCell and only on-demand SSB bursts may be transmitted via the SCell. For example, a UE may receive an indication at time to that the SCell is being configured, and the UE may subsequently receive an indication (e.g., via RRC signaling, via MAC-CE signaling) that the SCell is being activated at time $t_1$. In other examples, the configuration and activation of the SCell may be indicated at the same time (e.g., time $t_1$), for example, using a same signal. In any case, one or more on-demand SSB bursts 330-*a* may be transmitted via a carrier 305 associated with the SCell after the SCell is activated. Here, the UE may use the on-demand SSBs transmitted via the carrier 305 for the purposes of synchronizing with the SCell. The UE may complete the SCell activation at time $t_2$. In some examples, the UE may transmit a channel state information (CSI) report based on the reception of the on-demand SSB bursts 330-*a* via the carrier 305. The transmission of the on-demand SSBs may continue for some duration. For example, the on-demand SSB burst(s) 330-*a* may be transmitted via the SCell until a command deactivating the SCell is received by the UE (e.g., at time $t_3$). The one-demand SSB burst(s) 330-*a* may additionally, or alternatively, be transmitted prior to signaling activating the SCell (e.g., prior to time $t_1$), and the one or more on-demand SSB bursts may be used, for example, for synchronization and/or for L1/L3 measurements, among other examples.

In the example of the on-demand SSB transmission scheme 302, as illustrated in FIG. 3B, the always-on SSBs 315 may be periodically transmitted via the cell. For example, the UE may receive the indication at time $t_0$ that the SCell is being configured, and the UE may subsequently receive an indication (e.g., via RRC signaling, via MAC-CE signaling) that the SCell is being activated at time $t_1$. As similarly described above, the configuration and activation of the SCell may be indicated at the same time (e.g., time $t_1$), for example, using a same signal. In any case, one or more on-demand SSB bursts 330-*b* may be transmitted via a carrier 305 associated with the SCell after the SCell is activated. Here, the UE may use the on-demand SSB burst(s) 330-*b* transmitted via the carrier 305 for the purposes of synchronizing with the SCell and/or transmitting one or more CSI reports. The UE may complete the SCell activation at time $t_2$ and the transmission of the on-demand SSB burst(s) 330-*b* may continue for some duration of time. For example, the on-demand SSBs may be transmitted via the SCell until the SCell activation is completed (e.g., at time $t_2$). The always-on SSBs 315 may be transmitted with some periodicity on the carrier with the on-demand SSB bursts 330-*b*. The SCell may be deactivated via a command received at time $t_3$.

As described herein, the UE may determine when the one or more on-demand SSB bursts 330 begin (e.g., a first time instance) and end (e.g., a second time instance) on the SCell. In such cases, for both the on-demand SSB transmission scheme 301 and the on-demand SSB transmission scheme 302, the UE may expect that the one or more on-demand SSB bursts 330 are periodically transmitted from the first time instance until the second time instance, and the on-demand SSB bursts may not be transmitted after the second time instance. Additionally, or alternatively, for the on-demand SSB transmission scheme 301, the UE may expect that the one or more on-demand SSB bursts 330 are periodically transmitted from the first time instance until the second time instance and not after the second time instance, whereas for the on-demand SSB transmission scheme 302, the UE may expect that the one or more on-demand SSB bursts 330 are periodically transmitted N times after the first time instance and not transmitted after N on-demand SSB bursts are transmitted via the SCell. In any case, the UE may determine the first time instance and the second time instance to identify when the on-demand SSB bursts are to be received via the SCell using the described techniques.

As such, for both the on-demand SSB transmission scheme 301 and the on-demand SSB transmission scheme 302, the UE may determine the first time instance corresponding to a first on-demand SSB of the on-demand SSB bursts 330 associated with the SCell based on a time offset value that includes a quantity of time intervals (e.g., symbols, slots) after reception of the message indicating the transmission of the on-demand SSB bursts for the SCell. The time offset, T, may be based on a configured value (e.g., a first value, such as $\Delta_{MAC\text{-}CE}$ or $\Delta_{RRC}$) and at least one of a MAC-CE processing time (To) or a procedural delay value (e.g., $T_{RRC\ procedure\ delay}$). Further, the second time instance may be determined by the UE based on the time that the UE receives a command (e.g., a deactivation command) that indicates that the on-demand SSBs are being deactivated for the cell. Additionally, or alternatively, the second time instance may correspond to the time instance the UE transmits a feedback message (e.g., HARQ-ACK) in response to the command indicating deactivation of the on-demand SSB transmissions. In other examples, the second time instance may be the time at which the UE completes SCell activation (e.g., time $t_2$). The UE may expect the one or more on-demand SSB bursts to be periodically transmitted via the SCell between the first time instance and the second time instance.

FIGS. 4A, 4B, 4C, and 4D show examples of on-demand SSB transmission timelines 401, 402, 403, and 404, respectively, that each support transmission timelines for on-demand SSBs via secondary cells in accordance with one or more aspects of the present disclosure. In some examples, the on-demand SSB transmission timelines 401, 402, 403, and 404 may implement or be implemented by aspects of the wireless communications systems 100 and 200. For example, the on-demand SSB transmission timelines 401, 402, 403, and 404 may represent example implementations in which on-demand SSBs are transmitted from a network entity to a UE. The UE and the network entity may represent examples of corresponding devices, as described with reference to FIGS. 1 and 2. In some examples, the on-demand SSB transmission timelines 401, 402, 403, and 404 may each be an example of techniques for determining when on-demand SSB transmissions are to begin on an SCell when an indication of the on-demand SSB transmissions is received via MAC-CE signaling.

As described herein, a UE may determine a first time instance 405, such as first time instance 405-*a*, first time instance 405-*b*, first time instance 405-*c*, and first time instance 405-*d* (e.g., time instance A) corresponding to a first on-demand SSB of one or more on-demand SSB bursts 430 that are configured for and transmitted via an SCell. The time instance 405 may be determined based on a time offset value 415 (e.g., T) that includes a quantity of time intervals (e.g., symbols, slots) after reception of an indication 410 via a cell (e.g., cell 1, a PCell or an SCell), which indicates the transmission of the on-demand SSB bursts 430 for the SCell (e.g., cell 2). In some cases, the SCell configured with the on-demand SSB transmissions may have a same numerology as the cell transmitting the indication 410 of the on-demand SSB transmissions. Here, the indication 410 may be an example of a message, such as a MAC-CE message, that is signaled to the UE from a PCell or an SCell. The time offset value 415 may be based on a configured value (e.g., $\Delta_{MAC\text{-}CE}$) and a MAC-CE processing time (e.g., To). The MAC-CE processing time may be the time needed for the UE to decode a channel (e.g., PDSCH) that includes a MAC-CE and process MAC-CE information included in the MAC-CE. Additionally, the value of the time offset value 415 (e.g., T) may be greater than zero and/or may include one or multiple components. In some examples, the value of the time offset value 415 may not be not less than a timeline associated with the UE's MAC-CE processing time for SCell activation. Further, the time offset value 415 may, in some cases, be indicated and/or configured by the network entity. The time-domain positions of the one or more on-demand SSB bursts 430 may be configured by a network entity.

For the SSB burst(s) 430 indicated for on-demand SSB SCell operation via MAC-CE, the UE may expect that the one or more on-demand SSB bursts 430 are transmitted from the first time instance 405 until some later second time instance (e.g., time instance B). In some examples, such as illustrated in the on-demand SSB transmission timeline 401 and the on-demand SSB transmission timeline 402, a first time instance 405 (e.g., a first time instance 405-*a*, a first time instance 405-*b*) may be defined as the first symbol of the first actually transmitted SSB of an on-demand SSB burst 430 (e.g., on-demand SSB burst 430-*a*, on-demand SSB burst 430-*c*), which may be T (e.g., a time offset value 415, such as a time offset value 415-*a*, a time offset value 415-*b*) symbols after a slot 412 (e.g., slot 412-*a*, slot 412-*b*) during which the UE receives signaling from a network entity to indicate on-demand SSB transmission (e.g., the slot 412-*a* in which the UE receives the indication 410-*a*, the slot 412-*b* in which the UE receives the indication 410-*b*).

In particular, as shown in the on-demand SSB transmission timeline 401, the on-demand SSB burst 430-*a* may be the first on-demand SSB burst 430 that is available to the UE based on the reception of the indication 410-*a* in the slot 412-*a*, and further based on the first time instance 405-*a* derived using the time offset value 415-*a*. Here, one or more other SSBs may be transmitted on the cell prior to the first time instance 405-*a* (such as SSB burst 430-*b*), but those SSBs may not be available to the UE (e.g., because they may be transmitted prior to the first time instance 405-*a*).

As similarly shown in the on-demand SSB transmission timeline 402, the on-demand SSB burst 430-*c* may be the first on-demand SSB burst 430 that is available to the UE based on the reception of the indication 410-*b* in the slot 412-*b*, and further based on the first time instance 405-*b* derived using the time offset value 415-*b*. In such cases, one or more on-demand SSB bursts 430 may the transmitted prior to the first time instance 405-*b* (such as the on-demand SSB burst 430-*d*), and the on-demand SSB burst 430-*c* may be the first on-demand SSB burst 430 that is available for measurement by the UE based on the time offset value 415-*b* from the slot 412-*b* including the indication 410-*b*. It is noted that the indication 410 may be signaled at any time within the slot 412, and the illustrated position of the indication (e.g., the indication 410-*a*, the indication 410-*b*, the indication 410-*c*, the indication 410-*d*) should not be considered limiting.

In some examples, the value of the time offset value 415 (e.g., the time offset value 415-*a*, the time offset value 415-*b*), T may be determined using one or more techniques. For example, in a first technique, the time offset value 415 may be determined using Equation 1:

$$T = 14T_0 + \Delta_{MAC-CE} \tag{1}$$

where $$T_0 = 3N_{slot}^{subframe,\mu},\ N_{slot}^{subframe,\mu}$$

is a quantity of slots per subframe for a subcarrier spacing (SCS) configuration μ, and $\Delta_{MAC\text{-}CE}$ (e.g., a first value, a configured value) is configured as part of an on-demand SSB configuration signaled to the UE. In such cases, the time offset value 415 may correspond to a quantity of symbol periods. In some aspects, the use of the first techniques and Equation 1 for determining the time offset value 415 may enable on-demand SSB transmissions before the UE sends a feedback message 440 including HARQ-ACK information in response to reception of the indication 410 (e.g., a PDSCH carrying MAC-CE with on-demand SSB transmission indication). For example, there may be some cases, as illustrated by the on-demand SSB transmission timeline 401, in which the time instance 405-*a* may occur prior to the transmission of a feedback message 440-*a* acknowledging receipt of the indication 410-*a*. As such, the network entity may begin transmission of the one or more on-demand SSB bursts 430 even though the UE may not have decoded the indication 410. In some examples, an SCS for determining the value of T may be the SCS of the active downlink bandwidth part on which the UE receives the indication 410 (e.g., the on-demand SSB transmission indication signaling).

In other examples, a second technique may be used for determining the time offset value 415, which may include the use of Equation 2:

$$T = 14(m + T_0) + \Delta_{MAC-CE} \tag{2}$$

where $$T_0 = 3N_{slot}^{subframe,\mu},\ N_{slot}^{subframe,\mu}$$

is the quantity of slots per subframe for the SCS configuration μ, and $\Delta_{MAC\text{-}CE}$ is configurable as part of the on-demand SSB configuration. Additionally, n+m may correspond to a slot indicated for PUCCH transmission with HARQ-ACK information for the indication 410 (e.g., the PDSCH carrying the indication 410 received at slot n including signaling to indicate on-demand SSB transmission) if the UE is configured with HARQ-ACK transmissions in response to the reception of a PDSCH carrying MAC-CE. In such cases, the use of the second techniques and Equation 2 for determining the time offset value 415 may prevent on-demand SSB transmissions before the UE sends a feedback message 440-*b* including HARQ-ACK information in response to reception of the indication 410, which may provide increased efficiency in the system (e.g., due to a common knowledge between the UE and the network entity regarding the reception of the indication 410 based on the feedback from the UE). For example, there may be cases, as illustrated by the on-demand SSB transmission timeline 402, in which the time offset value 415-*b* occurs after the transmission of a feedback message 440-*b*, which enables the network entity to verify that the UE has received and decoded the indication 410-*b* signaling the transmission of the one or more on-demand SSB bursts 430. Further, the SCS for determining the value of T may be the SCS of the active downlink bandwidth part on which the UE receives the indication (e.g., the on-demand SSB transmission indication signaling).

Additionally, or alternatively, such as illustrated in the on-demand SSB transmission timeline 403 and the on-demand SSB transmission timeline 404, the first time instance 405 (e.g., a first time instance 405-*c*, a first time instance 405-*d*) may be defined as the beginning of a first slot 422 (e.g., slot 422-*a*, slot 422-*b*) that is T (e.g., a time offset value 415, such as a time offset value 415-*c*, time offset value 415-*d*) slots after a second slot 412 (e.g., slot 412-*c*, slot 412-*d*) where the UE receives the indication 410 (e.g., the indication 410-*c*, the indication 410-*d*, signaling indicating the on-demand SSB transmission), where the first slot 422 may at least partially overlap with a time-domain position (e.g., a first symbol, an OFDM symbol) of the first actually transmitted on-demand SSB of the one or more on-demand SSB bursts 430. In such examples, the time offset value 415 (e.g., T) may be in terms of a quantity of slots.

In some examples, and as illustrated in the on-demand SSB transmission timeline 403, the on-demand SSB burst 430-*e* may be the first on-demand SSB burst 430 that is available to the UE based on the reception of the indication 410-*c* in the slot 412-*c*, where the first time instance 405-*c* corresponding to the on-demand SSB burst 430-*c* is derived using the time offset value 415-*c*. One or more other SSBs/SSB bursts 430 may be transmitted via the cell prior to the first time instance 405-*c*, but those SSBs be unavailable to the UE (e.g., because they may be transmitted prior to the first time instance 405-*c*). In some aspects, the UE may receive and measure on-demand SSBs/on-demand SSB bursts 430-*f* that occur after the first time instance 405-*c*.

In examples shown in the on-demand SSB transmission timeline 404, the on-demand SSB burst 430-*g* may be the first on-demand SSB burst 430 that is available to the UE based on the reception of the indication 410-*d* in the slot 412-*d*, and further based on the first time instance 405-*d* derived using the time offset value 415-*d*. That is, the on-demand SSB burst 430-*c* may be the first on-demand SSB burst 430 that is available for measurement by the UE based on the time offset value 415-*d* from the slot 412-*d* including the indication 410-*d* and the slot 422-*b* that includes the on-demand SSB burst 430-*g* (e.g., the first actually transmitted SSB).

When the time offset value 415 (e.g., the time offset value 415-*c*, the time offset value 415-*d*) is in terms of a quantity of slots, the value of the time offset value 415 (e.g., T) may be determined using one or more techniques, including a third technique and a fourth technique. For example, in the third technique, the time offset value 415 may be determined using Equation 3:

$$T = T_0 + \Delta_{MAC-CE} \tag{3}$$

where $$T_0 = 3N_{slot}^{subframe,\mu},\ N_{slot}^{subframe,\mu}$$

is a quantity of slots per subframe for the SCS configuration μ, and $\Delta_{MAC\text{-}CE}$ (e.g., a first value, a configured value) is configured as part of an on-demand SSB configuration signaled to the UE. In such cases, the time offset value 415 may correspond to a quantity of symbol periods. The SCS for determining the value of T may be the SCS of the active downlink bandwidth part on which the UE receives the indication 410. In some examples, an SCS that is used for determining $$N_{slot}^{subframe,\mu}$$

and/or $\Delta_{MAC\text{-}CE}$ may be the SCS of the active downlink bandwidth part on which the UE receives the indication 410.

The fourth technique may include the use of Equation 4:

$$T = (m + T_0) + \Delta_{MAC-CE} \tag{4}$$

where $$T_0 = 3N_{slot}^{subframe,\mu},\ N_{slot}^{subframe,\mu}$$

is the quantity of slots per subframe for the SCS configuration μ, and $\Delta_{MAC\text{-}CE}$ is configurable as part of the on-demand SSB configuration. Additionally, n+m may correspond to a slot indicated for PUCCH transmission with HARQ-ACK information for the indication 410 (e.g., the PDSCH carrying the indication 410 received at slot n including signaling to indicate on-demand SSB transmission) if the UE is configured with HARQ-ACK transmissions in response to the reception of a PDSCH carrying MAC-CE. Similarly, the SCS for determining the value of T may be the SCS of the active downlink bandwidth part on which the UE receives the indication 410. Additionally, an SCS that is associated with (e.g., used to determine, corresponding to)

$$N_{slot}^{subframe,\mu}$$

and/or $\Delta_{MAC\text{-}CE}$ may be the SCS of the active downlink bandwidth part on which the UE receives the indication 410.

In some examples, as shown in the on-demand SSB transmission timeline 403, the time offset value 415-*c* may result in the availability of the on-demand SSB transmissions after the UE sends a feedback message 440-*c* including HARQ-ACK information in response to reception of the indication 410-*c*, which may provide increased efficiency in the system (e.g., due to a common knowledge between the UE and the network entity regarding the reception of the indication 410-*c* based on the feedback from the UE). For example, there may be cases in which the time offset value 415-*c* occurs after the transmission of the feedback message 440-*c*, which enables the network entity to ensure the UE has received and decoded the indication 410-*c* that signals the transmission of the one or more on-demand SSB bursts 430. In other examples illustrated by the on-demand SSB transmission timeline 404, the time offset value 415-*d* may result in the on-demand SSB transmissions that occur before the UE sends a feedback message 440-*d* including HARQ-ACK information in response to reception of the indication 410-*d* (e.g., a PDSCH carrying a MAC-CE with on-demand SSB transmission indication). For example, there may be some cases in which the time instance 405-*d* occurs prior to the transmission of the feedback message 440-*d* that acknowledges receipt of the indication 410-*d*. As such, the one or more on-demand SSB bursts 430 may be available to the UE even though the UE may not have decoded the indication 410-*d*.

The second time instance corresponding to a time when the on-demand SSBs stop transmission on the SCell may be based on one or more on-demand SSB transmission scenarios (e.g., due to different implementations of the one or more on-demand SSB bursts 430), such as those described herein with reference to the on-demand SSB transmission schemes 301 and 302.

As an example, when there is no always-on SSB transmission for the SCell, the second time instance may be defined as the time UE successfully receives an SCell deactivation command or the time UE sends a feedback message including (e.g., HARQ-ACK) in response to the reception of SCell deactivation command. Here, the SCell deactivation command may be a MAC-CE message or an RRC message (e.g., based on how an SCell activation command was signaled). Additionally, or alternatively, when an always-on SSB transmission is present on the SCell, the second time instance may be the time that the UE successfully completes SCell activation (e.g., transmitting a CSI report after UE receives the SCell activation command).

In some cases, and as illustrated by the transmission timelines 401, 402, 403, 404, one or more on-demand SSB bursts 430 may be transmitted in the SCell (e.g., cell 2), for example, for another connected mode UE before the UE receives the indication 410. However, the UE may only be aware of the one or more on-demand SSB burst transmissions that are available beginning at the first time instance 405.

Figure 5:
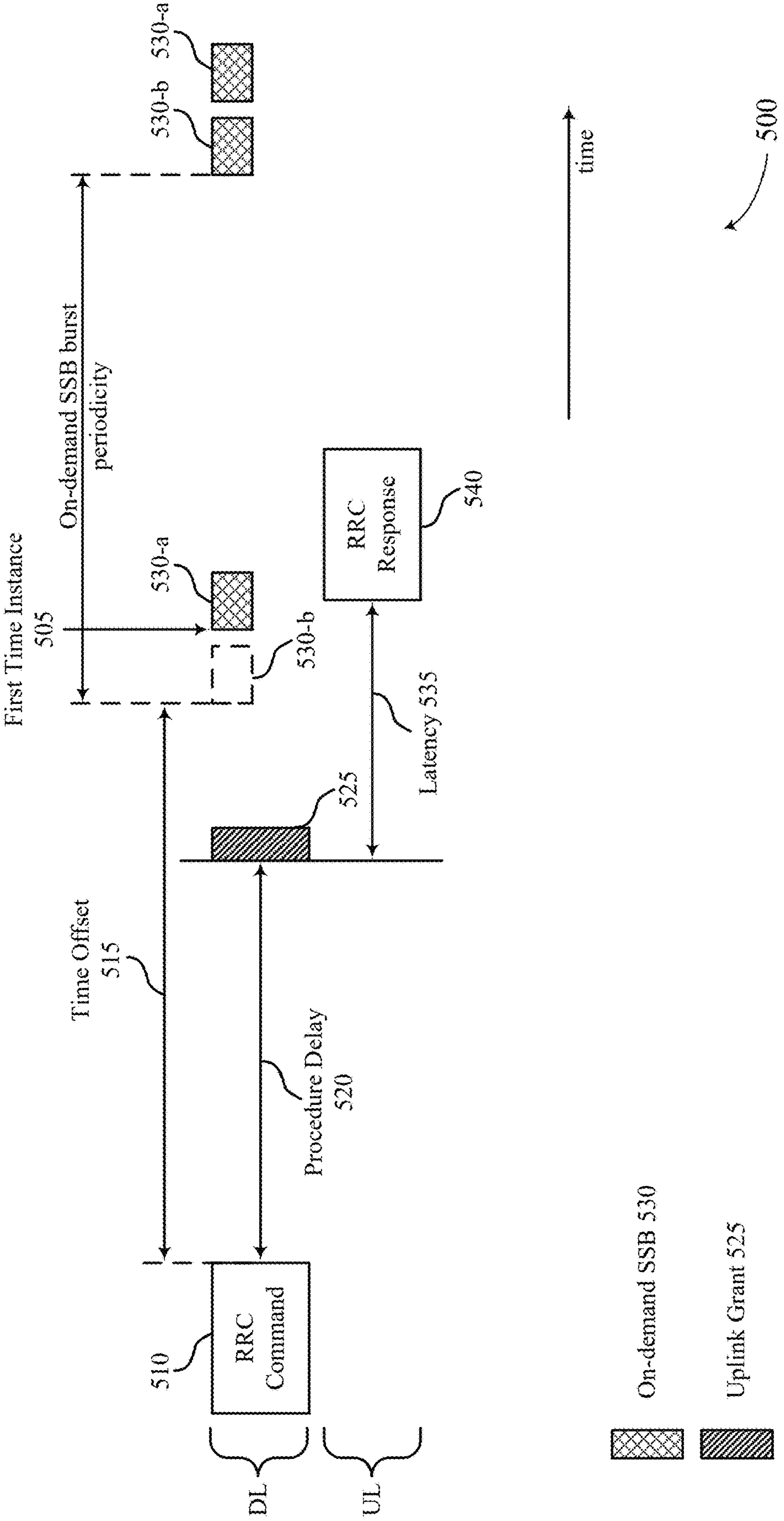
FIG. 5 shows an example of an on-demand SSB transmission timeline that supports transmission timelines for on-demand SSBs via secondary cells in accordance with one or more aspects of the present disclosure.

FIG. 5 shows an example of an on-demand SSB transmission timeline 500 that supports transmission timelines for on-demand SSBs via secondary cells in accordance with one or more aspects of the present disclosure. In some examples, the on-demand SSB transmission timeline 500 may implement or be implemented by aspects of the wireless communications systems 100 and 200. For example, the on-demand SSB transmission timeline 500 may represent example implementations in which on-demand SSBs are transmitted from a network entity to a UE. The UE and the network entity may represent examples of corresponding devices, as described with reference to FIGS. 1 and 2. In some examples, the on-demand SSB transmission timeline 500 may be an example of techniques for determining when on-demand SSB transmissions are to begin on an SCell when an indication of the on-demand SSB transmissions is received via RRC signaling.

As described herein, a UE may determine a first time instance 505 (e.g., time instance A) corresponding to a first on-demand SSB of one or more on-demand SSB bursts 530 that are configured for and transmitted via an SCell. The first time instance 505 may be determined based on a time offset value 515 (e.g., T) that includes a quantity of time intervals (e.g., symbols, slots) after reception of an indication 510 via a cell (e.g., cell 1, a PCell or an SCell), which indicates the transmission of the on-demand SSB bursts for the SCell (e.g., cell 2). In some cases, the SCell configured with the on-demand SSB transmissions may have a same numerology as the cell transmitting the indication 510 of the on-demand SSB transmissions. Here, the indication 510 may be an example of a message, such as an RRC message, that is signaled to the UE from a PCell or an SCell. The time offset value 515 may be based on a configured value (e.g., $\Delta_{RRC}$) and a procedural delay value (e.g., $T_{RRC\ procedure\ delay}$). Additionally, the value of the time offset value 515 (e.g., T) may be greater than zero and/or may include one or multiple components. In some examples, the value of the time offset value 515 may not be not less than a timeline associated with the UE's MAC-CE processing time for SCell activation. Further, the time offset value 515 may, in some cases, be indicated and/or configured by the network entity. The time-domain positions of the one or more on-demand SSB bursts 530 may be configured by a network entity. For the SSB burst(s) 530 indicated for on-demand SSB SCell operation via RRC signaling, the UE may expect that the one or more on-demand SSB bursts 530 are transmitted from the first time instance 505 until some later second time instance (e.g., time instance B).

In some examples, there may be a procedural delay value 520 (e.g., an RRC procedure delay) between the reception of the indication 510 and an uplink grant 525 (e.g., providing the UE with resources for transmitting a response), and the procedural delay value 520 may be defined by some wireless communications standards or protocols. However, there may some additional latency 535 between the reception of the uplink grant 525 and the transmission of an uplink response 540 by the UE. In some cases, the latency 535 may be UE-specific and based on UE implementation. As a result, a network entity may not know when the UE may be capable to send the uplink response 540. In such cases, the response 540 may not be suitable as a reference point for the UE to determine the timeline for the one or more on-demand SSB bursts 530 transmitted via the SCell. Thus, in some aspects, the determination of the first time instance 505 (e.g., time instance A) may be based on the time offset value 515 (e.g., T) that is based on the RRC procedure delay (e.g., $T_{RRC\ procedure\ delay}$) and/or the timing that the UE receives the uplink grant 525.

In particular, the first time instance 505 may be defined as a first symbol of the first actually transmitted SSB of the one or more on-demand SSB bursts 530 which may be T symbols after the slot in which the UE receives the indication 510 (e.g., signaling from a network entity (in PDSCH) to indicate on-demand SSB transmission). Additionally, or alternatively, the first time instance 505 may be defined as a first symbol of the first actually transmitted SSB of the one or more on-demand SSB bursts 530 which may be T symbols after the slot in which the UE receives PDCCH including the uplink grant 525.

Here, the time offset value 515 may be in terms of a quantity of symbols, and the time offset value may accordingly be determined using Equation 5:

$$T = 14T_{RRC\ procedure\ delay}N_{slot}^{subframe,\mu} + \Delta_{RRC} \quad (5)$$

where $T_{RRC\ procedure\ delay}$ may be a value or quantity defined in some wireless communications standard, $$N_{slot}^{subframe,\mu}$$

is the quantity of (e.g., number of) slots per subframe for the SCS configuration μ, and $\Delta_{RRC}$ is a quantity of symbols and configurable as part of the on-demand SSB configuration for the SCell. In some examples, the SCS for determining the value of T (e.g., the time offset value 515) may be the SCS of the active downlink bandwidth part on which the UE receives the indication 510 (e.g., the on-demand SSB transmission indication signaling) or on which the UE receives the uplink grant 525. In some examples, an SCS that is used for determining $$N_{slot}^{subframe,\mu}$$

and/or $\Delta_{RRC}$ may be the SCS of the active downlink bandwidth part on which the UE receives the indication 410.

In some examples, one or more on-demand SSBs (and/or on-demand SSB bursts) may not be transmitted via the SCell, and the first time instance 505 may accordingly correspond to the first actually transmitted one or more SSBs on the SCell. As an example, one or more SSBs of a first on-demand SSB burst 530-*a* may be the first actually transmitted SSBs for the SCell, as one or more additional SSBs of a second on-demand SSB burst 530-*b* may not be transmitted via the SCell.

In some other examples, the first time instance 505 may be defined as a beginning of a slot that is T slots after a second slot in which the UE receives the indication 510 (e.g., signaling from a network entity (in PDSCH) to indicate on-demand SSB transmission). In another example, the first time instance 505 may be defined as beginning of a slot that is T slots after the slot in which the UE receives the PDCCH including the uplink grant 525. In these examples, the time offset value 515 (e.g., T) may be in terms of a quantity of slots. Accordingly, the time offset value 515 may accordingly be determined using Equation 6:

$$T = T_{RRC\ procedure\ delay}N_{slot}^{subframe,\mu} + \Delta_{RRC} \quad (5)$$

where $T_{RRC\ procedure\ delay}$ may be a value or quantity defined in some wireless communications standard, $$N_{slot}^{subframe,\mu}$$

is the number of slots per subframe for the SCS configuration μ, and $\Delta_{RRC}$ is a quantity of symbols and configurable as part of the on-demand SSB configuration for the SCell. In some examples, the SCS for determining the value of T (e.g., the time offset value 515) may be the SCS of the active downlink bandwidth part on which the UE receives the indication 510 (e.g., the on-demand SSB transmission indication signaling) or on which the UE receives the uplink grant 525. In some examples, the use of Equation 6 for determining the time offset value 515 may be applicable in cases where a reference time for the time offset value 515 is from a time in which the UE receives signaling (e.g., via a PDSCH from the network, the indication 510) to indicate the transmission of the on-demand SSBs. Here, the on-demand SSB transmission may, in some examples, be available for the UE some duration before the uplink grant 525 is received.

In another example, the time offset value 515 may be determined using Equation 7:

$$T = \Delta_{RRC} \tag{7}$$

where $\Delta_{RRC}$ is a value that is configured and/or signaled to the UE. In such cases, a reference time for the time offset value 515 (e.g., T) may be a time at which the UE receives the uplink grant 525 (and the values $T_{RRC\ procedure\ delay}$, $$N_{slot}^{subframe,\mu}$$

may not be excluded from the calculation of the time offset value 515).

The second time instance (e.g., time instance B) corresponding to a time when the on-demand SSBs stop transmission on the SCell may be based on one or more on-demand SSB transmission scenarios (e.g., due to different implementations of the one or more on-demand SSB bursts 530), such as those described herein with reference to the on-demand SSB transmission schemes 301 and 302.

As an example, when there is no always-on SSB transmission for the SCell, the second time instance may be defined as the time UE successfully receives an SCell deactivation command or the time UE sends a feedback message including (e.g., HARQ-ACK) in response to the reception of SCell deactivation command. Here, the SCell deactivation command may be a MAC-CE message or an RRC message (e.g., based on how an SCell activation command was signaled). Additionally, or alternatively, when an always-on SSB transmission is present on the SCell, the second time instance may be the time that the UE successfully completes SCell activation (e.g., transmitting a CSI report after UE receives the SCell activation command).

Figure 6:
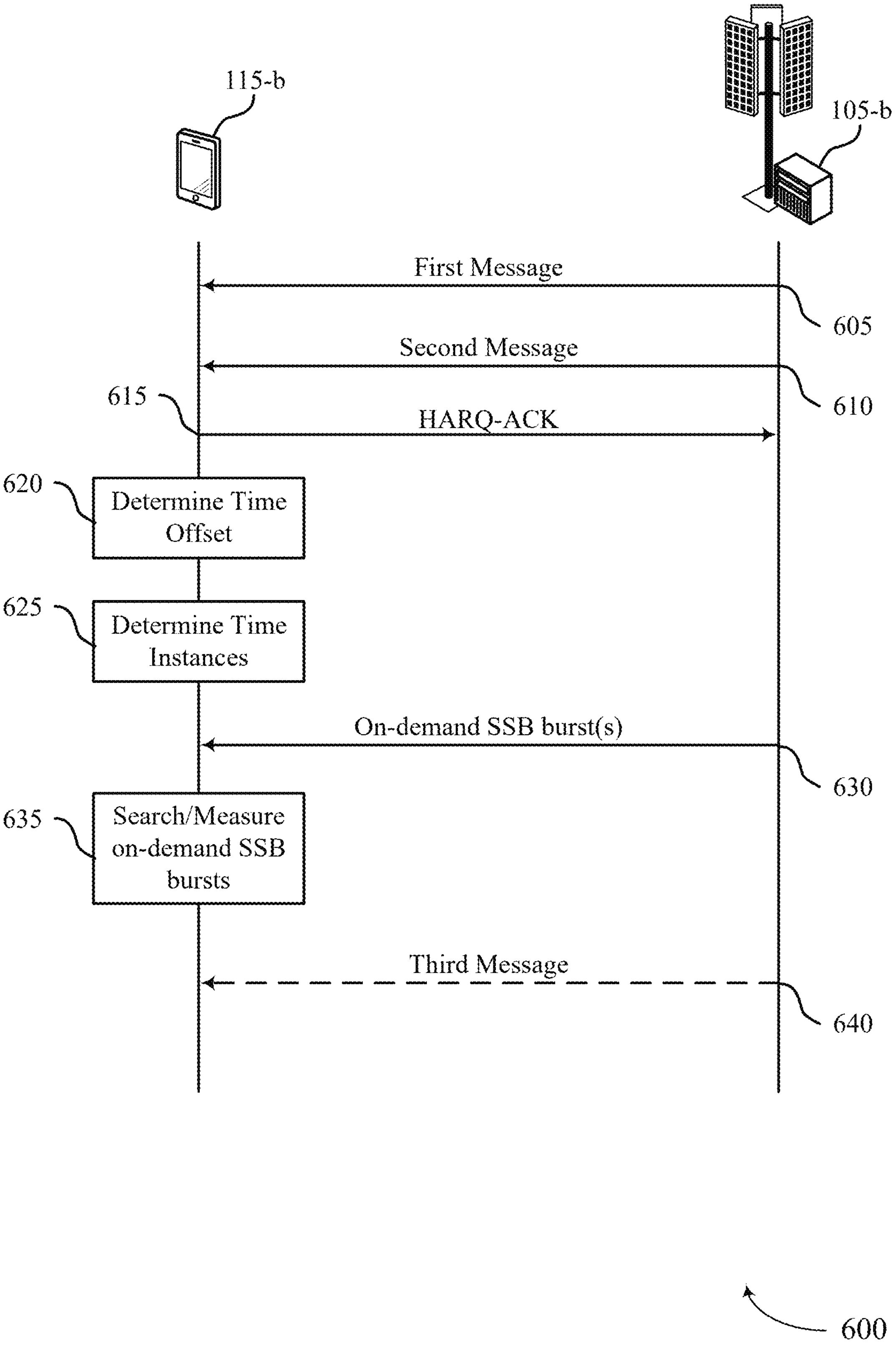
FIG. 6 shows an example of a process flow that supports transmission timelines for on-demand SSBs via secondary cells in accordance with one or more aspects of the present disclosure.

FIG. 6 shows an example of a process flow 600 that supports transmission timelines for on-demand SSBs via secondary cells in accordance with one or more aspects of the present disclosure. The process flow 600 may implement or be implemented by aspects of the wireless communications systems 100 and 200, the on-demand SSB transmission schemes 301 and 302, the on-demand SSB transmission timeline 401, the on-demand SSB transmission timeline 402, the on-demand SSB transmission timeline 403, the on-demand SSB transmission timeline 404, or the on-demand SSB transmission timeline 500, as described with reference to FIGS. 1, 2, 3A, 3B, 4 and 5. For example, the process flow 600 illustrates communications between a network entity 105-*b* and a UE 115-*b*, which may represent examples of corresponding devices as described with reference to FIGS. 1, 2, 3A, 3B, 4 and 5.

In the following description of the process flow 600, the operations may be performed in different orders or at different times. Some operations may also be left out of the process flow 600, or other operations may be added. Although network entity 105-*b* and the UE 115-*b* are shown performing the operations of the process flow 600, some aspects of some operations may also be performed by one or more other wireless communication devices.

At 605, the network entity 105-*a* may transmit, and the UE 115-*b* may receive, a first message configuring on-demand transmission for one or more on-demand SSB bursts associated with a cell (e.g., an SCell). In some examples, the first message may include one or multiple configurations of on-demand SSB bursts.

At 610, the network entity 105-*a* may transmit, and the UE 115-*b* may receive, a second message indicating transmission of the one or more on-demand SSB bursts associated with the cell. In some examples, the second message may be an example of an RRC message or a MAC-CE message. In some examples, the second message may include a configuration of a first value (e.g., $\Delta_{MAC\text{-}CE}$, $\Delta_{RRC}$). The first message and/or the second message may be transmitted from a PCell or an SCell. In some examples, the second message may be receive by the UE 115 via a PDSCH or via a PDCCH. In some examples, the second message may include a bit flag (e.g., having a bit value of 0 or 1, or some other value) that indicates the transmission of the on-demand SSBs via the cell.

In cases where the first message includes multiple configurations of the on-demand SSB transmissions (e.g., multiple on-demand SSB configurations, multiple on-demand SSB burst configurations), the second message may include both the indication of the transmission of the one or more on-demand SSB bursts and an indication of one of the configurations included in the first message. That is, the first message may include multiple on-demand SSB configurations, and the second message may indicate (e.g., select, identify) an on-demand SSB configuration of the multiple on-demand SSB configurations, and the second message may further indicate that the on-demand SSBs for the indicated on-demand SSB configuration are to be transmitted via the cell.

At 615, the UE 115-*b* may transmit, and the network entity 105-*b* may receive, a feedback message within a slot, where the feedback message indicates feedback (e.g., HARQ-ACK) for the second message. In some examples, the slot may occur prior to a first time instance corresponding to a first on-demand SSB transmitted via the cell. In some cases, the network entity may start transmission of the one or more on-demand SSB bursts based on reception of the feedback message.

At 620, the UE 115-*b* may determine a time offset value that indicates when a first on-demand SSB of the one or more on-demand SSB bursts will be received. The time offset value includes a quantity of time intervals after a first time interval (e.g., a slot) during which the second message is received. The time offset value may be based on a first value and at least one of a MAC-CE processing time or a procedural delay value. As an example, the UE 115-*b* may calculate the time offset value based on a sum of the first value ($\Delta_{MAC\text{-}CE}$) and a MAC-CE processing time ($T_0$) (e.g., shown in Equations 1 through 4), such as when the second message is receive via MAC-CE signaling. In such cases, the time offset value may be based on a slot associated with a feedback message indicating feedback for the second message. In some examples, the MAC-CE processing time includes a multiple of a quantity of slots per subframe associated with a subcarrier spacing value, where the subcarrier spacing value corresponds to an active bandwidth part associated with the second message. In some cases, a first time instance corresponding to a start of on-demand SSB transmissions via the cell corresponds to a first symbol period of the first actual SSB transmitted via the cell. Here, the first time interval may include a slot in which the second message is received, and the time offset may include a quantity of time intervals including a quantity of symbol periods. In some other examples, the first time instance corresponds to a beginning of a first slot including the first on-demand SSB transmitted via the cell, where the first time interval include a slot in which the second message is received, and the quantity of time intervals is a quantity of slots.

In other examples, the UE 115-*b* may calculate the time offset value based at least in part on a sum of the first value ($\Delta_{RRC}$) and the procedural delay value ($T_{RRC\ procedure\ delay}$) (e.g., shown in Equations 5 and 6), such as when the second message is received via RRC signaling. In such cases, the time offset value may be based on a quantity of slots per subframe associated with a subcarrier spacing value. Here, the subcarrier spacing value may correspond to a bandwidth part associated with the first message configuring the on-demand transmission for the one or more on-demand SSB bursts. In some examples, a first time instance corresponds to a first symbol period of a first on-demand SSB transmitted via the cell, and a quantity of time intervals included in the time offset is a quantity of symbol periods. In other examples, the first time instance corresponds to a beginning of a first slot including the first on-demand SSB transmitted via the cell, and wherein the quantity of time intervals of the time offset includes a quantity of slots.

At 625, the UE 115-*b* may determine, based on the time offset value, a first time instance that corresponds to a first on-demand SSB transmitted via the cell, the first on-demand SSB is included in an SSB burst of the one or more SSB bursts. In some cases, the first time instance corresponds to a time interval (e.g., a slot) during which the PDSCH is received or during which the PDCCH is received.

In some examples, the UE 115-*b* may further determine a second time instance at which the one or more on-demand SSB bursts end transmission via the cell. The second time instance may include a second time interval (e.g., slot) in which a deactivation message is received, where the deactivation message may indicate that the cell is deactivated. In some examples, the second time instance may correspond to slot in which a feedback message including an acknowledgment of the deactivation message is transmitted. Additionally, or alternatively, the second time instance may correspond to a second time interval in which a CSI report is transmitted by the UE 115-*b*, where the CSI report being is sent based on an activation of the cell.

At 630, network entity 105-*b* may transmit the first on-demand SSB and the one or more on-demand SSB bursts via the cell in accordance with the first message, the second message, the first time instance, and the time offset value. In such cases, the UE 115-*b* may expect that the on-demand SSBs are periodically transmitted between the first time instance and the second time instance. In such cases, the UE 115-*b* may receive the one or more on-demand SSB bursts via the cell in accordance with the second message, the first time instance, and the time offset value. Here, the first SSB that corresponds to the first time instance may be used as a reference for when the on-demand SSB transmissions will be made available for the UE 115-*b*.

At 635, the UE 115-*b* may accordingly search for and/or measure the SSBs of the one or more on-demand SSB bursts received by the UE 115-*b* at 630. In some examples, the UE 115-*b* may selectively measure one or more on-demand SSBs of the one or more on-demand SSB bursts (e.g., based on UE performance, based on how the SSBs may be used by the UE 115-*b*, based on a choice by the UE 115-*b*, among other examples). For instance, the UE 115-*b* may measure all or a subset of the SSBs included in the one or more SSB bursts.

At 640, the network entity 105-*b* may transmit, and the UE 115-*b* may receive, a third message indicating a termination of the one or more on-demand SSB bursts associated with the cell. In some examples, the indication included in the third message may be an indication that the one or more on-demand SSBs are unavailable or no longer available (e.g., indicating an unavailability of on-demand SSB transmissions). In such cases, the one or more SSB bursts may stop after the third message is received in accordance with the termination indication. In some aspects, the third message may be received form the PCell or an SCell. In some examples, the second message may be receive by the UE 115 via a PDSCH or via a PDCCH. The third message may include the bit flag, for example, having a bit value of 0 or 1 to indicate that the on-demand SSBs are no longer available (e.g., are deactivated), and will cease transmission, for the cell.

Figure 7:
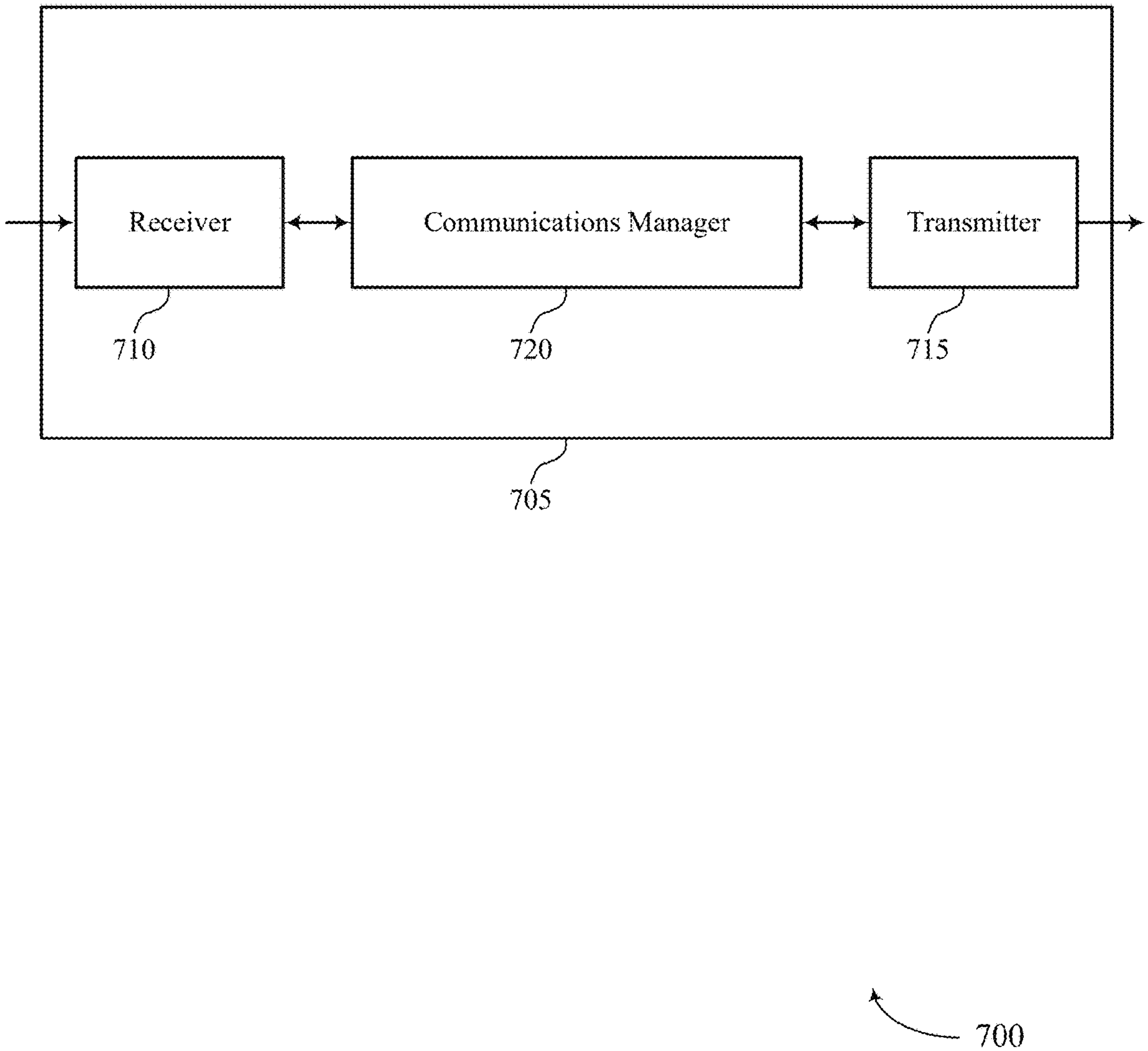
FIGS. 7 and 8 show block diagrams of devices that support transmission timelines for on-demand SSBs via secondary cells in accordance with one or more aspects of the present disclosure.

FIG. 7 shows a block diagram 700 of a device 705 that supports transmission timelines for on-demand SSBs via secondary cells in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to transmission timelines for on-demand SSBs via secondary cells). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmission timelines for on-demand SSBs via secondary cells). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of transmission timelines for on-demand SSBs via secondary cells as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving a first message configuring on-demand transmission for one or more SSB bursts associated with a cell. The communications manager 720 is capable of, configured to, or operable to support a means for receiving a second message indicating transmission of the one or more SSB bursts associated with the cell. The communications manager 720 is capable of, configured to, or operable to support a means for determining, based on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based on a first value and at least one of a MAC-CE processing time or a procedural delay value. The communications manager 720 is capable of, configured to, or operable to support a means for receiving the one or more SSB bursts via the cell in accordance with the second message, the first time instance, and the time offset value. In some examples, the communications manager 720 is capable of, configured to, or operable to support a means for receiving the first SSB and the one or more SSB bursts via the cell in accordance with the second message, the first time instance, and the time offset value.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, and more efficient utilization of communication resources. For example, the described techniques may support definitions used by a device to determine when and where one or more on-demand SSB burst transmissions will begin and end on a cell, which may enable enhanced power saving techniques for various wireless communication devices in a system.

Figure 8:
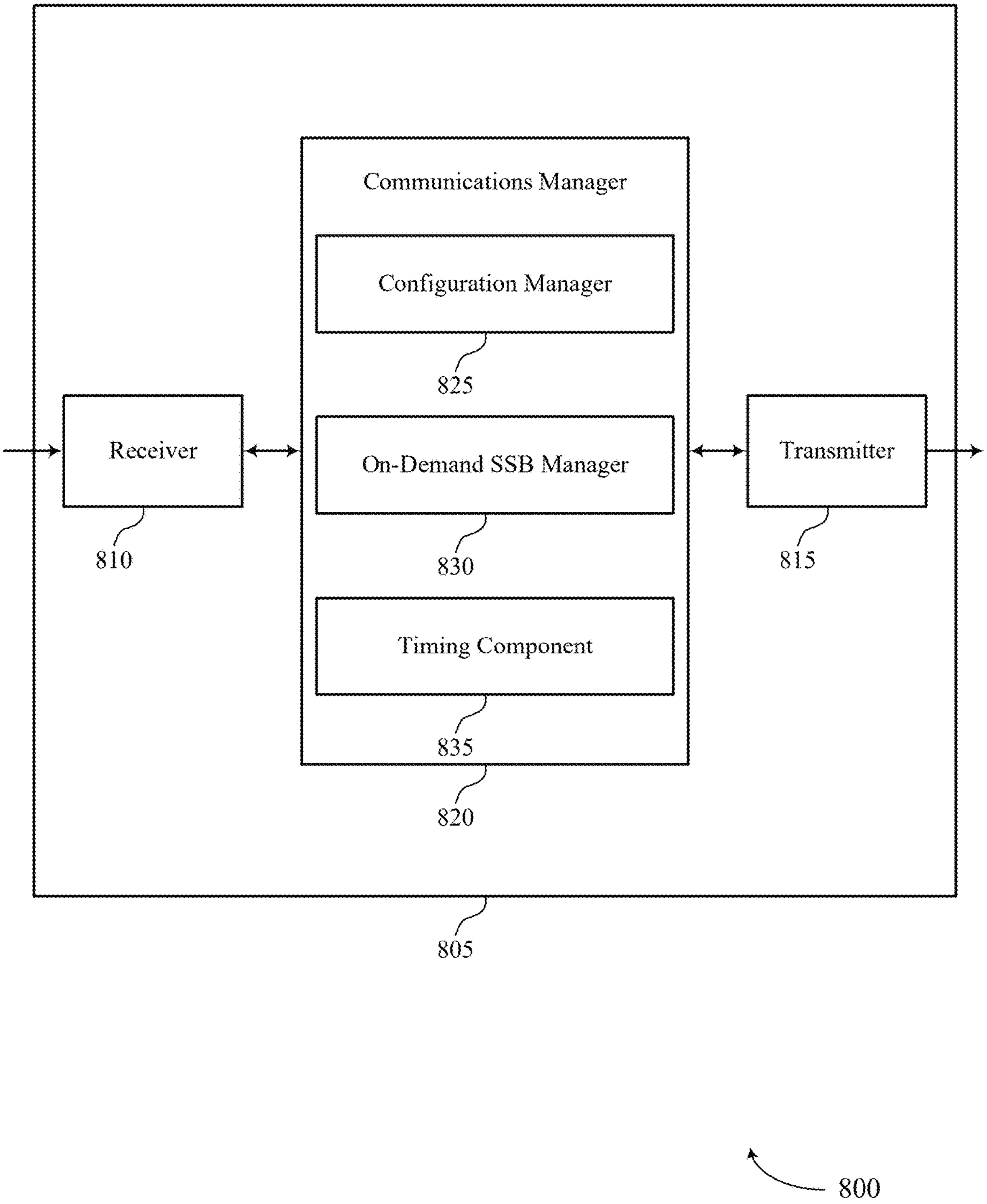

FIG. 8 shows a block diagram 800 of a device 805 that supports transmission timelines for on-demand SSBs via secondary cells in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to transmission timelines for on-demand SSBs via secondary cells). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to transmission timelines for on-demand SSBs via secondary cells). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of transmission timelines for on-demand SSBs via secondary cells as described herein. For example, the communications manager 820 may include a configuration manager 825, an on-demand SSB manager 830, a timing component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The configuration manager 825 is capable of, configured to, or operable to support a means for receiving a first message configuring on-demand transmission for one or more SSB bursts associated with a cell. The on-demand SSB manager 830 is capable of, configured to, or operable to support a means for receiving a second message indicating transmission of the one or more SSB bursts associated with the cell. The timing component 835 is capable of, configured to, or operable to support a means for determining, based on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based on a first value and at least one of a MAC-CE processing time or a procedural delay value. The on-demand SSB manager 830 is capable of, configured to, or operable to support a means for receiving the one or more SSB bursts via the cell in accordance with the second message, the first time instance, and the time offset value.

Figure 9:
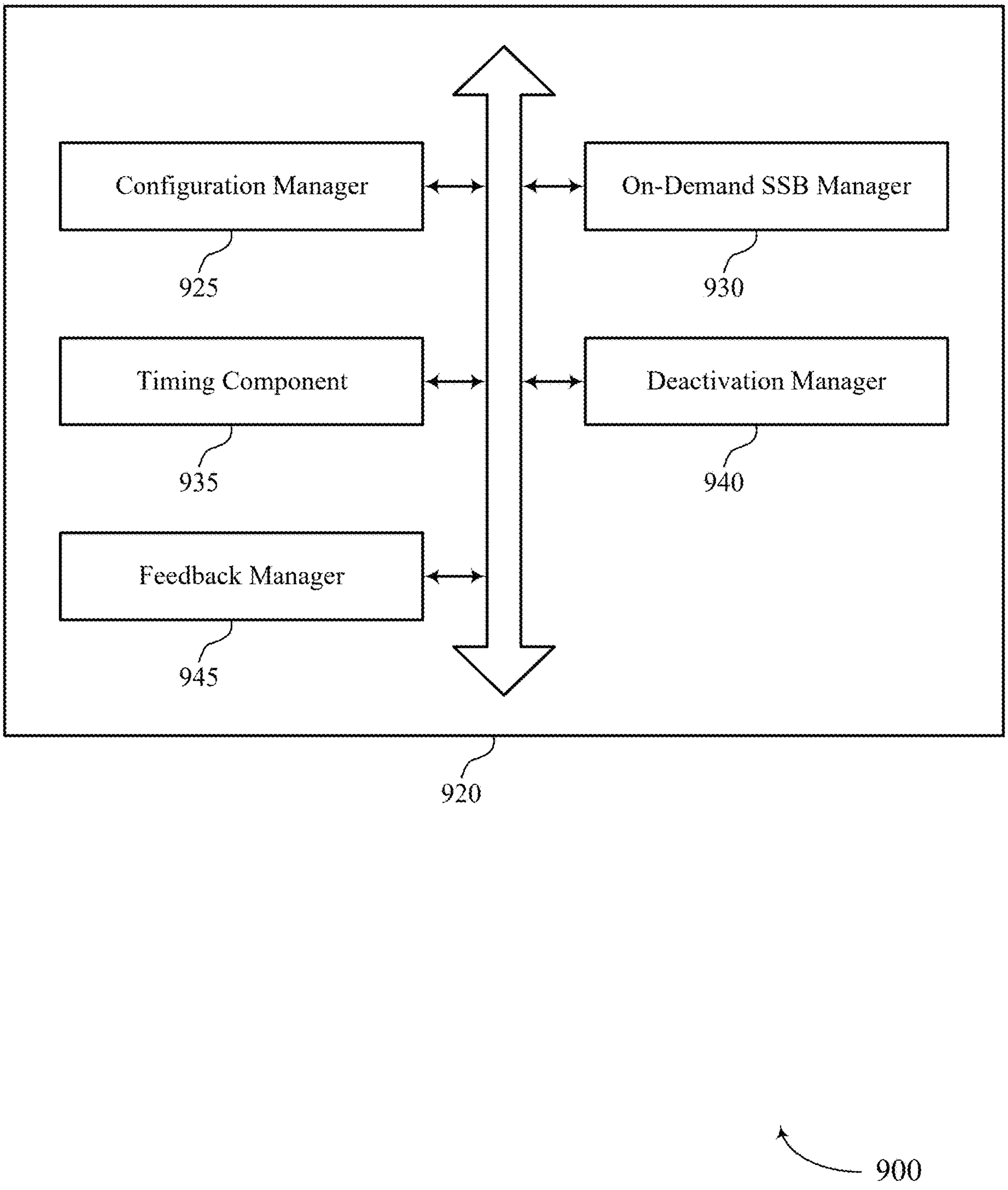
FIG. 9 shows a block diagram of a communications manager that supports transmission timelines for on-demand SSBs via secondary cells in accordance with one or more aspects of the present disclosure.

FIG. 9 shows a block diagram 900 of a communications manager 920 that supports transmission timelines for on-demand SSBs via secondary cells in accordance with one or more aspects of the present disclosure. The communications manager 920 may be an example of aspects of a communications manager 720, a communications manager 820, or both, as described herein. The communications manager 920, or various components thereof, may be an example of means for performing various aspects of transmission timelines for on-demand SSBs via secondary cells as described herein. For example, the communications manager 920 may include a configuration manager 925, an on-demand SSB manager 930, a timing component 935, a deactivation manager 940, a feedback manager 945, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The configuration manager 925 is capable of, configured to, or operable to support a means for receiving a first message configuring on-demand transmission for one or more SSB bursts associated with a cell. The on-demand SSB manager 930 is capable of, configured to, or operable to support a means for receiving a second message indicating transmission of the one or more SSB bursts associated with the cell. The timing component 935 is capable of, configured to, or operable to support a means for determining, based on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based on a first value and at least one of a MAC-CE processing time or a procedural delay value. In some examples, the on-demand SSB manager 930 is capable of, configured to, or operable to support a means for receiving the one or more SSB bursts via the cell in accordance with the second message, the first time instance, and the time offset value.

In some examples, the second message includes a medium access control-control element, and the timing component 935 is capable of, configured to, or operable to support a means for calculating the time offset value based on a sum of the first value and the MAC-CE processing time.

In some examples, the time offset value is further based on a slot associated with a feedback message indicating feedback for the second message, and the feedback manager 945 is capable of, configured to, or operable to support a means for transmitting the feedback message within the slot, the slot occurring prior to the first time instance corresponding to the first SSB transmitted via the cell, where receiving the one or more SSB bursts via the cell is based on the feedback message.

In some examples, the MAC-CE processing time includes a multiple of a quantity of slots per subframe associated with a subcarrier spacing value, the subcarrier spacing value corresponding to an active bandwidth part associated with the second message. In some examples, the first time instance includes a first symbol period of the first SSB transmitted via the cell. In some examples, the first time interval includes a slot in which the second message is received. In some examples, the quantity of time intervals includes a quantity of symbol periods.

In some examples, the first time instance includes a start of a first slot including the first SSB transmitted via the cell. In some examples, the first time interval includes a slot in which the second message is received. In some examples, the quantity of time intervals includes a quantity of slots. In some examples, the first message configuring on-demand transmission for the one or more SSB bursts further includes a configuration of the first value.

In some examples, the second message includes an RRC message, and the timing component 935 is capable of, configured to, or operable to support a means for calculating the time offset value based on a sum of the first value and the procedural delay value.

In some examples, to support receiving the second message, the on-demand SSB manager 930 is capable of, configured to, or operable to support a means for receiving the second message via a physical downlink shared channel, where the first time interval corresponds to a slot during which the physical downlink shared channel is received.

In some examples, to support receiving the second message, the on-demand SSB manager 930 is capable of, configured to, or operable to support a means for receiving the second message via a physical downlink control channel, the second message further including an uplink grant for transmitting a response message, where the first time interval corresponds to a slot during which the physical downlink control channel is received.

In some examples, the time offset value is further based on a quantity of slots per subframe associated with a subcarrier spacing value, the subcarrier spacing value corresponding to a bandwidth part associated with the first message configuring the on-demand transmission for the one or more SSB bursts.

In some examples, the first time instance includes a first symbol period of the first SSB transmitted via the cell. In some examples, the quantity of time intervals includes a quantity of symbol periods. In some examples, the first time instance includes a start of a first slot including the first SSB transmitted via the cell. In some examples, the quantity of time intervals includes a quantity of slots.

In some examples, the timing component 935 is capable of, configured to, or operable to support a means for determining a second time instance at which the one or more SSB bursts end transmission via the cell, the second time instance including a second time interval in which a deactivation message is received, where the deactivation message indicates that the cell is deactivated.

In some examples, the deactivation manager 940 is capable of, configured to, or operable to support a means for receiving a deactivation message including an indication that the cell is deactivated. In some examples, the timing component 935 is capable of, configured to, or operable to support a means for determining a second time instance at which the one or more SSB bursts end transmission via the cell, the second time instance including a second time interval in which a feedback message including an acknowledgment of the deactivation message is transmitted.

In some examples, the timing component 935 is capable of, configured to, or operable to support a means for determining a second time instance at which the one or more SSB bursts end transmission via the cell, the second time instance including a second time interval in which a channel state information report is transmitted, the channel state information report being based on an activation of the cell.

In some examples, the deactivation manager 940 is capable of, configured to, or operable to support a means for receiving, after the first time instance, a third message indicating a termination of the one or more SSB bursts associated with the cell, where the one or more SSB bursts stop after the third message is received in accordance with the termination of the one or more SSB bursts, and where the third message is received form a primary cell or a secondary cell.

In some examples, the first value is based on an active bandwidth part associated with the second message. In some examples, the first message or the second message, or both, are received from a primary cell or a secondary cell.

Figure 10:
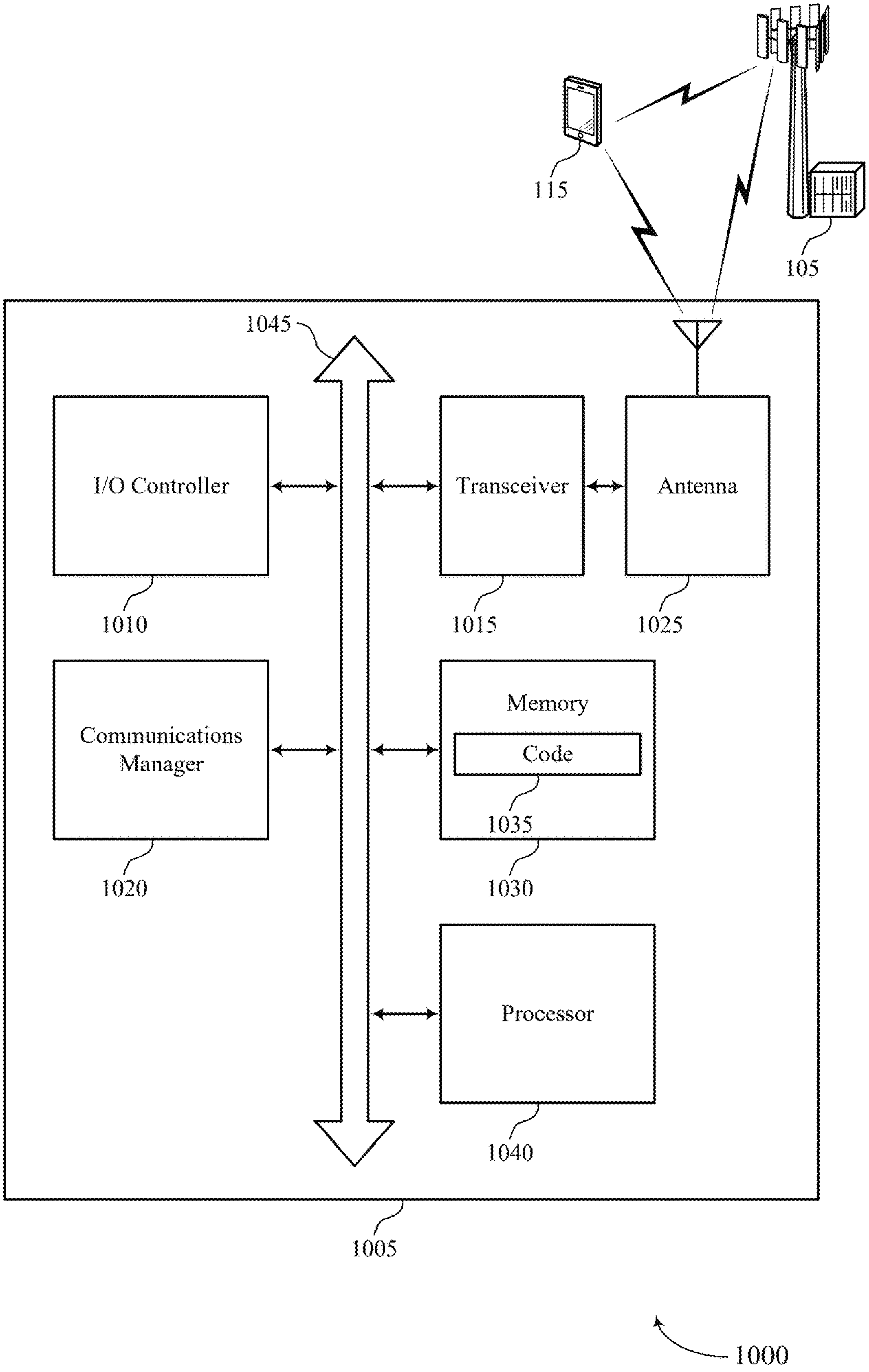
FIG. 10 shows a diagram of a system including a device that supports transmission timelines for on-demand SSBs via secondary cells in accordance with one or more aspects of the present disclosure.

FIG. 10 shows a diagram of a system 1000 including a device 1005 that supports transmission timelines for on-demand SSBs via secondary cells in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting transmission timelines for on-demand SSBs via secondary cells). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving a first message configuring on-demand transmission for one or more SSB bursts associated with a cell. The communications manager 1020 is capable of, configured to, or operable to support a means for receiving a second message indicating transmission of the one or more SSB bursts associated with the cell. The communications manager 1020 is capable of, configured to, or operable to support a means for determining, based on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based on a first value and at least one of a MAC-CE processing time or a procedural delay value. The communications manager 1020 is capable of, configured to, or operable to support a means for receiving the one or more SSB bursts via the cell in accordance with the second message, the first time instance, and the time offset value.

By including or configuring the communications manager 1020 in accordance with examples as described herein, the device 1005 may support techniques for improved user experience related to reduced processing, reduced power consumption, more efficient utilization of communication resources, improved coordination between devices, longer battery life, and improved utilization of processing capability, among other advantages. In some aspects, the described techniques may support definitions used by a device to determine when and where one or more on-demand SSB burst transmissions will begin and end on a cell, which may enable enhanced power saving techniques for various wireless communication devices in a system.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of transmission timelines for on-demand SSBs via secondary cells as described herein, or the at least one processor 1040 and the at least one memory 1030 may be otherwise configured to, individually or collectively, perform or support such operations.

Figure 11:
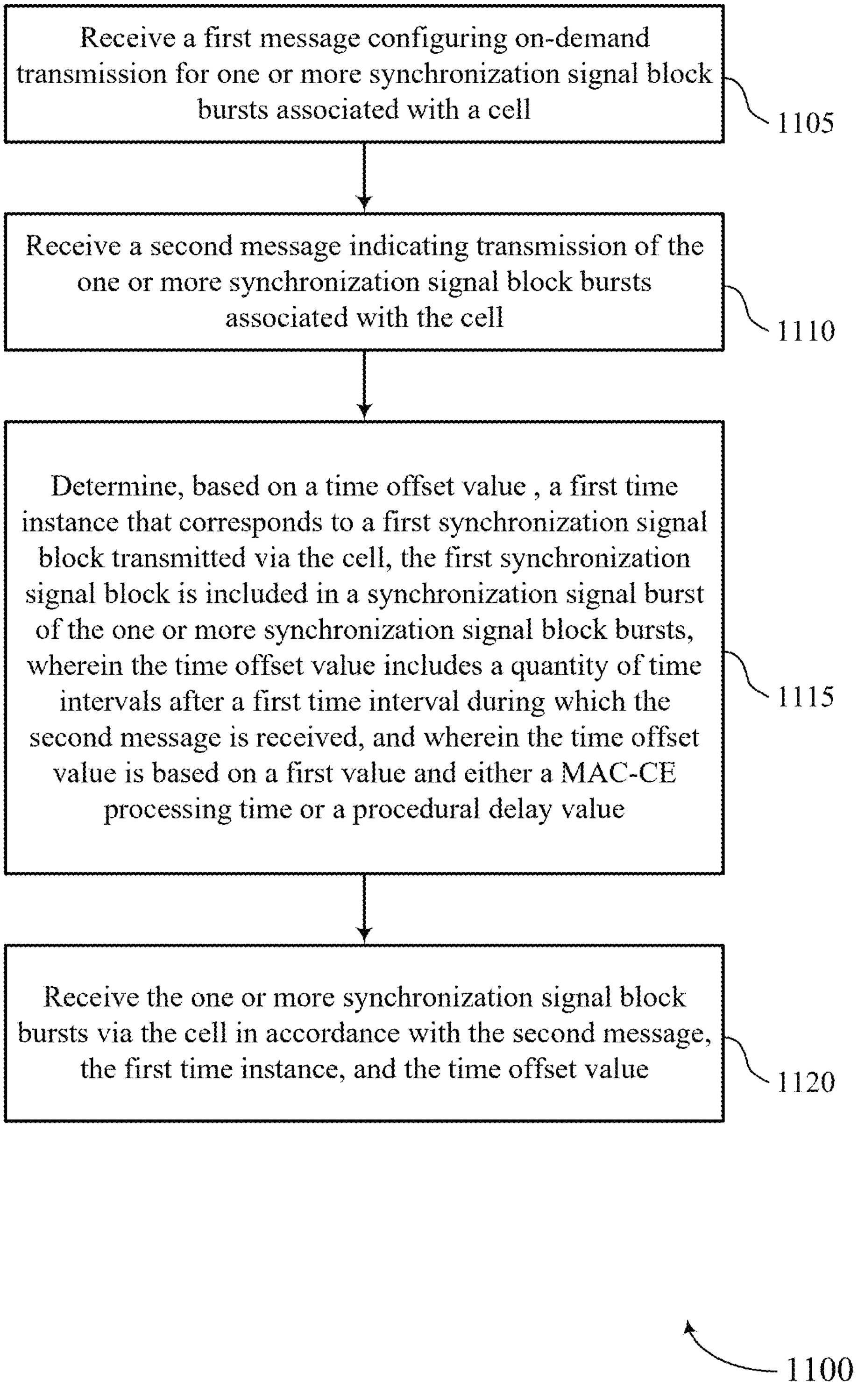
FIGS. 11 through 14 show flowcharts illustrating methods that support transmission timelines for on-demand SSBs via secondary cells in accordance with one or more aspects of the present disclosure.

FIG. 11 shows a flowchart illustrating a method 1100 that supports transmission timelines for on-demand SSBs via secondary cells in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a first message configuring on-demand transmission for one or more SSB bursts associated with a cell. The operations of 1105 may be performed in accordance with examples as disclosed herein. In some examples, aspects of the operations of 1105 may be performed by a configuration manager 925 as described with reference to FIG. 9.

At 1110, the method may include receiving a second message indicating transmission of the one or more SSB bursts associated with the cell. The operations of 1110 may be performed in accordance with examples as disclosed herein. In some examples, aspects of the operations of 1110 may be performed by an on-demand SSB manager 930 as described with reference to FIG. 9.

At 1115, the method may include determining, based at least in part on a time offset value, a first time instance that corresponds to a first SSB transmitted via the cell, the first SSB is included in an SSB of the one or more SSB bursts, wherein the time offset value includes a quantity of time intervals after a first time interval during which the second message is received, and wherein the time offset value is based at least in part on a first value and at least one of a MAC-CE processing time or a procedural delay value. The operations of 1115 may be performed in accordance with examples as disclosed herein. In some examples, aspects of the operations of 1115 may be performed by a timing component 935 as described with reference to FIG. 9.

At 1120, the method may include receiving the one or more SSB bursts via the cell in accordance with the second message, the first time instance, and the time offset value. The operations of 1120 may be performed in accordance with examples as disclosed herein. In some examples, aspects of the operations of 1120 may be performed by an on-demand SSB manager 930 as described with reference to FIG. 9.

Figure 12:
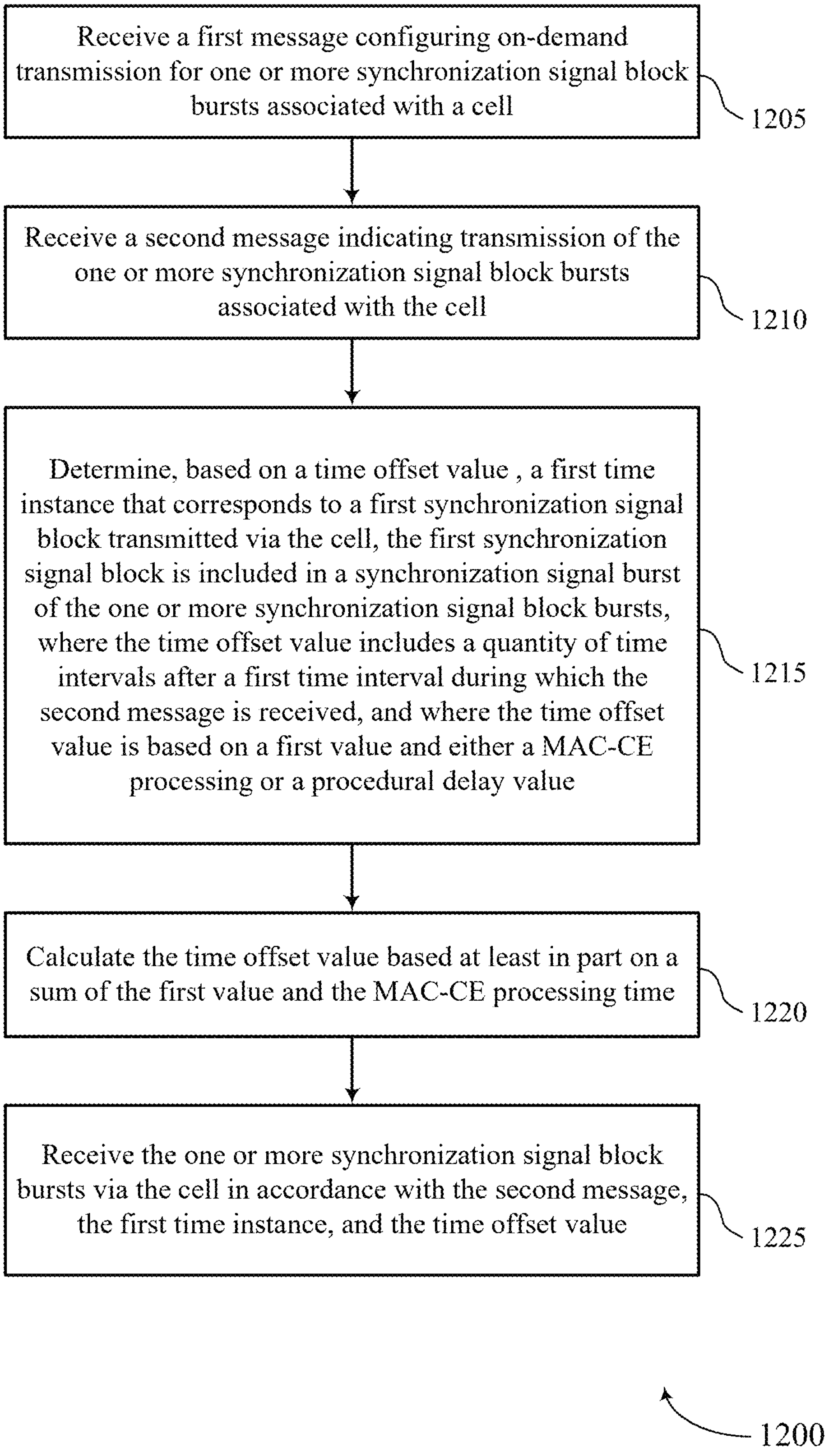

FIG. 12 shows a flowchart illustrating a method 1200 that supports transmission timelines for on-demand SSBs via secondary cells in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving a first message configuring on-demand transmission for one or more SSB bursts associated with a cell. The operations of 1205 may be performed in accordance with examples as disclosed herein. In some examples, aspects of the operations of 1205 may be performed by a configuration manager 925 as described with reference to FIG. 9.

At 1210, the method may include receiving a second message indicating transmission of the one or more SSB bursts associated with the cell. The operations of 1210 may be performed in accordance with examples as disclosed herein. In some examples, aspects of the operations of 1210 may be performed by an on-demand SSB manager 930 as described with reference to FIG. 9.

At 1215, the method may include determining, based at least in part on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based at least in part on a first value and at least one of a MAC-CE processing time or a procedural delay value. The operations of 1215 may be performed in accordance with examples as disclosed herein. In some examples, aspects of the operations of 1215 may be performed by a timing component 935 as described with reference to FIG. 9.

At 1220, the method may include calculating the time offset value based at least in part on a sum of the first value and the MAC-CE processing time. The operations of 1220 may be performed in accordance with examples as disclosed herein. In some examples, aspects of the operations of 1220 may be performed by a timing component 935 as described with reference to FIG. 9.

At 1225, the method may include receiving the one or more SSB bursts via the cell in accordance with the second message, the first time instance, and the time offset value. The operations of 1225 may be performed in accordance with examples as disclosed herein. In some examples, aspects of the operations of 1225 may be performed by an on-demand SSB manager 930 as described with reference to FIG. 9.

Figure 13:
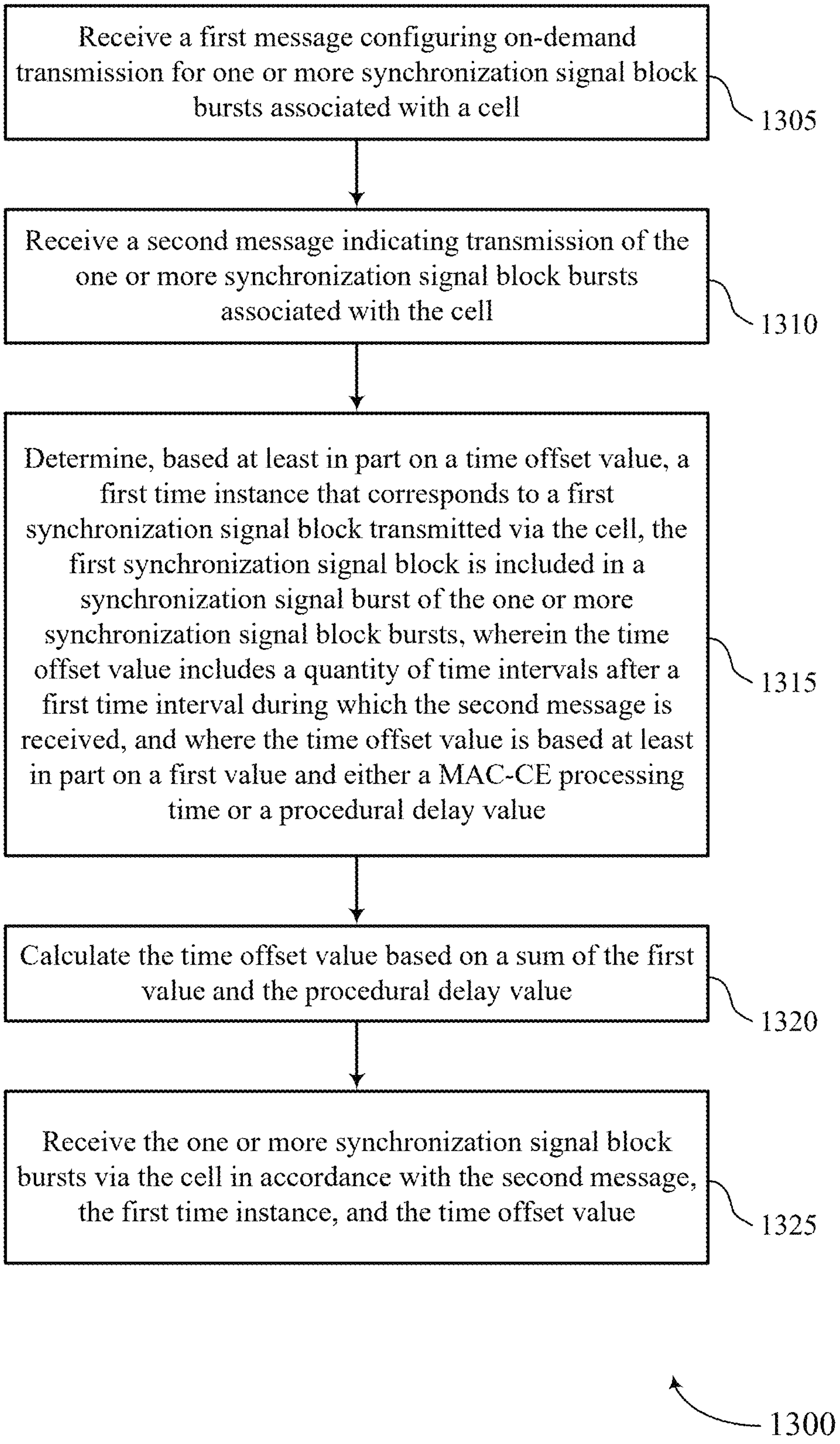

FIG. 13 shows a flowchart illustrating a method 1300 that supports transmission timelines for on-demand SSBs via secondary cells in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving a first message configuring on-demand transmission for one or more SSB bursts associated with a cell. The operations of 1305 may be performed in accordance with examples as disclosed herein. In some examples, aspects of the operations of 1305 may be performed by a configuration manager 925 as described with reference to FIG. 9.

At 1310, the method may include receiving a second message indicating transmission of the one or more SSB bursts associated with the cell. The operations of 1310 may be performed in accordance with examples as disclosed herein. In some examples, aspects of the operations of 1310 may be performed by an on-demand SSB manager 930 as described with reference to FIG. 9.

At 1315, the method may include determining, based on a time offset value, a first time instance that corresponds to a first SSB transmitted via the cell, the first SSB is included in an SSB of the one or more SSB bursts, where the time offset value includes a quantity of time intervals after a first time interval during which the second message is received, and where the time offset value is based on a first value and at least one of a MAC-CE processing time or a procedural delay value. The operations of 1315 may be performed in accordance with examples as disclosed herein. In some examples, aspects of the operations of 1315 may be performed by a timing component 935 as described with reference to FIG. 9.

At 1320, the method may include calculating the time offset value based on a sum of the first value and the procedural delay value. The operations of 1320 may be performed in accordance with examples as disclosed herein. In some examples, aspects of the operations of 1320 may be performed by a timing component 935 as described with reference to FIG. 9.

At 1325, the method may include receiving the one or more SSB bursts via the cell in accordance with the second message, the first time instance, and the time offset value. The operations of 1325 may be performed in accordance with examples as disclosed herein. In some examples, aspects of the operations of 1325 may be performed by an on-demand SSB manager 930 as described with reference to FIG. 9.

Figure 14:
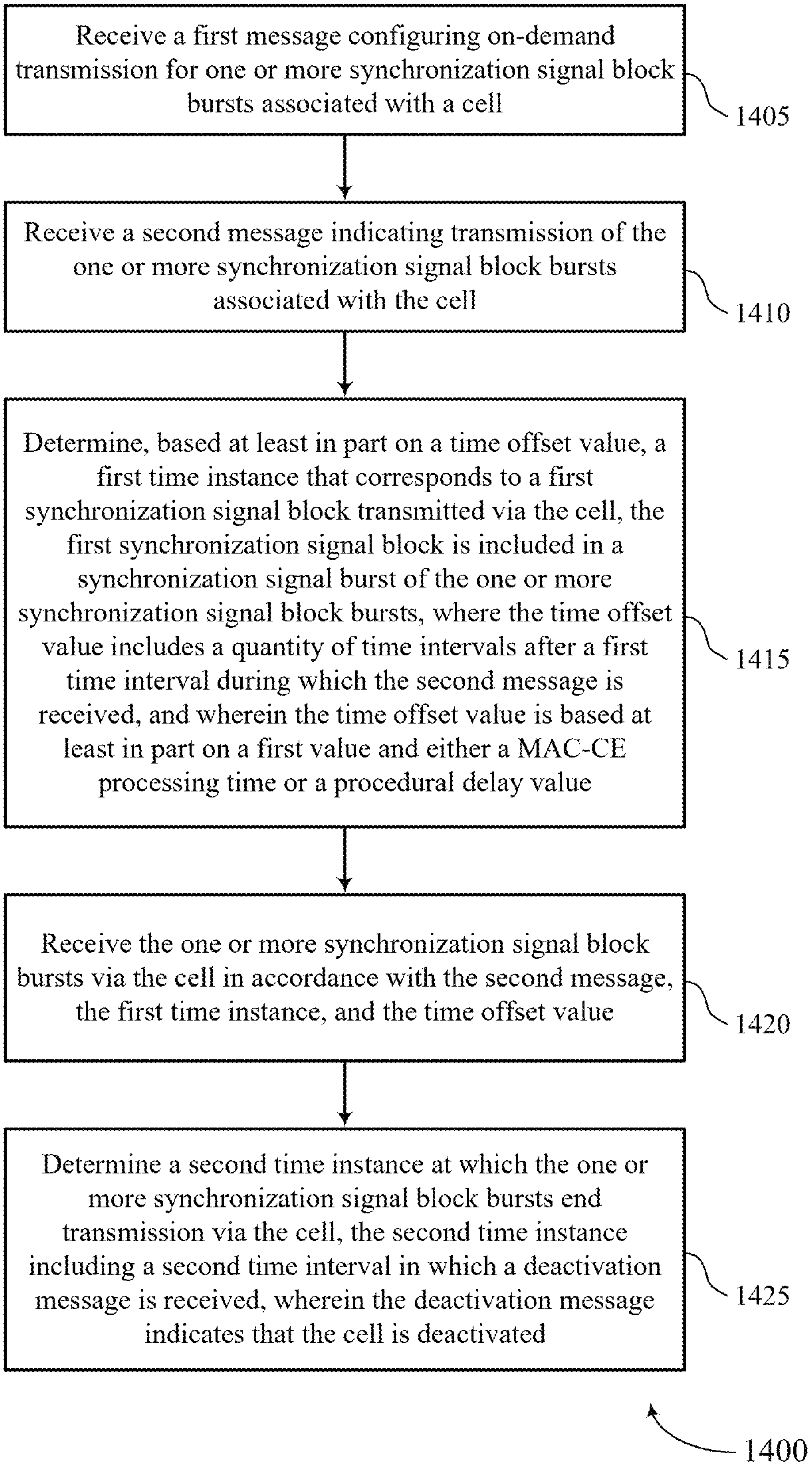

FIG. 14 shows a flowchart illustrating a method 1400 that supports transmission timelines for on-demand SSBs via secondary cells in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include receiving a first message configuring on-demand transmission for one or more SSB bursts associated with a cell. The operations of 1405 may be performed in accordance with examples as disclosed herein. In some examples, aspects of the operations of 1405 may be performed by a configuration manager 925 as described with reference to FIG. 9.

At 1410, the method may include receiving a second message indicating transmission of the one or more SSB bursts associated with the cell. The operations of 1410 may be performed in accordance with examples as disclosed herein. In some examples, aspects of the operations of 1410 may be performed by an on-demand SSB manager 930 as described with reference to FIG. 9.

At 1415, the method may include determining, based on a time offset value, a first time instance that corresponds to a first SSB transmitted via the cell, the first SSB is included in an SSB of the one or more SSB bursts, wherein the time offset value includes a quantity of time intervals after a first time interval during which the second message is received, and wherein the time offset value is based at least in part on a first value and at least one of a MAC-CE processing time or a procedural delay value. The operations of 1415 may be performed in accordance with examples as disclosed herein. In some examples, aspects of the operations of 1415 may be performed by a timing component 935 as described with reference to FIG. 9.

At 1420, the method may include receiving the one or more SSB bursts via the cell in accordance with the second message, the first time instance, and the time offset value. The operations of 1420 may be performed in accordance with examples as disclosed herein. In some examples, aspects of the operations of 1420 may be performed by an on-demand SSB manager 930 as described with reference to FIG. 9.

At 1425, the method may include determining a second time instance at which the one or more SSB bursts end transmission via the cell, the second time instance including a second time interval in which a deactivation message is received, where the deactivation message indicates that the cell is deactivated. The operations of 1425 may be performed in accordance with examples as disclosed herein. In some examples, aspects of the operations of 1425 may be performed by a timing component 935 as described with reference to FIG. 9.

The following provides an overview of aspects of the present disclosure:

Aspect 1: A method for wireless communications, comprising: receiving a first message configuring on-demand transmission for one or more synchronization signal block bursts associated with a cell; receiving a second message indicating transmission of the one or more synchronization signal block bursts associated with the cell; determining, based at least in part on a time offset value, a first time instance that corresponds to a first synchronization signal block transmitted via the cell, the first synchronization signal block is included in a synchronization signal block burst of the one or more synchronization signal block bursts, wherein the time offset value comprises a quantity of time intervals after a first time interval during which the second message is received, and wherein the time offset value is based at least in part on a first value and at least one of a medium access control-control element (MAC-CE) processing time or a procedural delay value; and receiving the one or more synchronization signal block bursts via the cell in accordance with the second message, the first time instance, and the time offset value.

Aspect 2: The method of aspect 1, wherein the second message comprises a MAC-CE, the method further comprising: calculating the time offset value based at least in part on a sum of the first value and the MAC-CE processing time.

Aspect 3: The method of aspect 2, wherein the time offset value is further based at least in part on a slot associated with a feedback message indicating feedback for the second message, the method further comprising: transmitting the feedback message within the slot, the slot occurring prior to the first time instance corresponding to the first synchronization signal block transmitted via the cell, wherein receiving the one or more synchronization signal block bursts via the cell is based at least in part on the feedback message.

Aspect 4: The method of any of aspects 2 through 3, wherein the MAC-CE processing time comprises a multiple of a quantity of slots per subframe associated with a subcarrier spacing value, the subcarrier spacing value corresponding to an active bandwidth part associated with the second message.

Aspect 5: The method of aspect 2, wherein the first time instance comprises a first symbol period of the first synchronization signal block transmitted via the cell, the first time interval comprises a slot in which the second message is received, and the quantity of time intervals comprises a quantity of symbol periods.

Aspect 6: The method of aspect 2, wherein the first time instance comprises a start of a first slot comprising the first synchronization signal block transmitted via the cell, the first time interval comprises a slot in which the second message is received, and the quantity of time intervals comprises a quantity of slots.

Aspect 7: The method of any of aspects 2 through 6, wherein the first message configuring on-demand transmission for the one or more synchronization signal block bursts further comprises a configuration of the first value.

Aspect 8: The method of aspect 1, wherein the second message comprises an RRC message, the method further comprising: calculating the time offset value based at least in part on a sum of the first value and the procedural delay value.

Aspect 9: The method of aspect 8, wherein receiving the second message further comprises: receiving the second message via a physical downlink shared channel, wherein the first time interval corresponds to a slot during which the physical downlink shared channel is received.

Aspect 10: The method of any of aspects 8 through 9, wherein receiving the second message further comprises: receiving the second message via a physical downlink control channel, the second message further comprising an uplink grant for transmitting a response message, wherein the first time interval corresponds to a slot during which the physical downlink control channel is received.

Aspect 11: The method of any of aspects 8 through 10, wherein the time offset value is further based at least in part on a quantity of slots per subframe associated with a subcarrier spacing value, the subcarrier spacing value corresponding to a bandwidth part associated with the first message configuring the on-demand transmission for the one or more synchronization signal block bursts.

Aspect 12: The method of any of aspects 8 through 10, wherein the first time instance comprises a first symbol period of the first synchronization signal block transmitted via the cell, and the quantity of time intervals comprises a quantity of symbol periods.

Aspect 13: The method of any of aspects 8 through 10, wherein the first time instance comprises a start of a first slot comprising the first synchronization signal block transmitted via the cell, and the quantity of time intervals comprises a quantity of slots.

Aspect 14: The method of any of aspects 1 through 13, further comprising: determining a second time instance at which the one or more synchronization signal block bursts end transmission via the cell, the second time instance comprising a second time interval in which a deactivation message is received, wherein the deactivation message indicates that the cell is deactivated.

Aspect 15: The method of any of aspects 1 through 14, further comprising: receiving a deactivation message comprising an indication that the cell is deactivated; and determining a second time instance at which the one or more synchronization signal block bursts end transmission via the cell, the second time instance comprising a second time interval in which a feedback message comprising an acknowledgment of the deactivation message is transmitted.

Aspect 16: The method of any of aspects 1 through 15, further comprising: determining a second time instance at which the one or more synchronization signal block bursts end transmission via the cell, the second time instance comprising a second time interval in which a channel state information report is transmitted, the channel state information report being based at least in part on an activation of the cell.

Aspect 17: The method of any of aspects 1 through 16, further comprising: receiving, after the first time instance, a third message indicating a termination of the one or more synchronization signal block bursts associated with the cell, wherein the one or more synchronization signal block bursts stop after the third message is received in accordance with the termination of the one or more synchronization signal block bursts, and wherein the third message is received form a primary cell or a secondary cell.

Aspect 18: The method of any of aspects 1 through 17, wherein the first value is based at least in part on an active bandwidth part associated with the second message.

Aspect 19: The method of any of aspects 1 through 18, wherein the first message or the second message, or both, are received from a primary cell or a secondary cell.

Aspect 20: An apparatus for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the apparatus to perform a method of any of aspects 1 through 19.

Aspect 21: An apparatus for wireless communications, comprising at least one means for performing a method of any of aspects 1 through 19.

Aspect 22: A non-transitory computer-readable medium storing code for wireless communications, the code comprising instructions executable by one or more processors (e.g., directly, indirectly, after pre-processing, without pre-processing) to perform a method of any of aspects 1 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, for example, A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining, and the like. Also, "determining" or "identifying" can include receiving (such as receiving information or signaling, e.g., receiving information or signaling for determining, receiving information or signaling for identifying), accessing (such as accessing data in a memory, or accessing information), and the like. Also, "determining" or "identifying" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
- one or more memories storing processor-executable code; and
- one or more processors coupled with the one or more memories and individually or collectively operable to execute the code to cause the apparatus to:
  - receive a first message configuring on-demand transmission for one or more synchronization signal block bursts associated with a cell;
  - receive a second message indicating transmission of the one or more synchronization signal block bursts associated with the cell;
  - determine, based at least in part on a time offset value, a first time instance that corresponds to a first synchronization signal block transmitted via the cell, the first synchronization signal block is included in a synchronization signal block burst of the one or more synchronization signal block bursts, wherein the time offset value comprises a quantity of time intervals after a first time interval during which the second message is received, and wherein the time offset value is based at least in part on a first value and at least one of a medium access control-control element (MAC-CE) processing time or a procedural delay value; and
  - receive the one or more synchronization signal block bursts via the cell in accordance with the second message, the first time instance, and the time offset value.

2. The apparatus of claim 1, wherein the second message comprises a MAC-CE, and the one or more processors are individually or collectively further operable to execute the code to cause the apparatus to:

calculate the time offset value based at least in part on a sum of the first value and the MAC-CE processing time.

3. The apparatus of claim 2, wherein the time offset value is further based at least in part on a slot associated with a feedback message indicating feedback for the second message, and the one or more processors are individually or collectively further operable to execute the code to cause the apparatus to:

transmit the feedback message within the slot, the slot occurring prior to the first time instance corresponding to the first synchronization signal block transmitted via the cell, wherein receiving the one or more synchronization signal block bursts via the cell is based at least in part on the feedback message.

4. The apparatus of claim 2, wherein the MAC-CE processing time comprises a multiple of a quantity of slots per subframe associated with a subcarrier spacing value, the subcarrier spacing value corresponding to an active bandwidth part associated with the second message.

5. The apparatus of claim 2, wherein the first time instance comprises a first symbol period of the first synchronization signal block transmitted via the cell, wherein the first time interval comprises a slot in which the second message is received, and wherein the quantity of time intervals comprises a quantity of symbol periods.

6. The apparatus of claim 2, wherein the first time instance comprises a start of a first slot comprising the first synchronization signal block transmitted via the cell, wherein the first time interval comprises a slot in which the second message is received, and wherein the quantity of time intervals comprises a quantity of slots.

7. The apparatus of claim 2, wherein the first message configuring on-demand transmission for the one or more synchronization signal block bursts further comprises a configuration of the first value.

8. The apparatus of claim 1, wherein the second message comprises a radio resource control message, and the one or more processors are individually or collectively further operable to execute the code to cause the apparatus to:

calculate the time offset value based at least in part on a sum of the first value and the procedural delay value.

9. The apparatus of claim 8, wherein, to receive the second message, the one or more processors are individually or collectively further operable to execute the code to cause the apparatus to:

receive the second message via a physical downlink shared channel, wherein the first time interval corresponds to a slot during which the physical downlink shared channel is received.

10. The apparatus of claim 8, wherein, to receive the second message, the one or more processors are individually or collectively further operable to execute the code to cause the apparatus to:

receive the second message via a physical downlink control channel, the second message further comprising an uplink grant for transmitting a response message, wherein the first time interval corresponds to a slot during which the physical downlink control channel is received.

11. The apparatus of claim 8, wherein the time offset value is further based at least in part on a quantity of slots per subframe associated with a subcarrier spacing value, the subcarrier spacing value corresponding to a bandwidth part associated with the first message configuring the on-demand transmission for the one or more synchronization signal block bursts.

12. The apparatus of claim 8, wherein the first time instance comprises a first symbol period of the first synchronization signal block transmitted via the cell, and wherein the quantity of time intervals comprises a quantity of symbol periods.

13. The apparatus of claim 8, wherein the first time instance comprises a start of a first slot comprising the first synchronization signal block transmitted via the cell, and wherein the quantity of time intervals comprises a quantity of slots.

14. The apparatus of claim 1, wherein the one or more processors are individually or collectively further operable to execute the code to cause the apparatus to:

determine a second time instance at which the one or more synchronization signal block bursts end transmission via the cell, the second time instance comprising a second time interval in which a deactivation message is received, wherein the deactivation message indicates that the cell is deactivated.

15. The apparatus of claim 1, wherein the one or more processors are individually or collectively further operable to execute the code to cause the apparatus to:

receive a deactivation message comprising an indication that the cell is deactivated; and determine a second time instance at which the one or more synchronization signal block bursts end transmission via the cell, the second time instance comprising a second time interval in which a feedback message comprising an acknowledgment of the deactivation message is transmitted.

16. The apparatus of claim 1, wherein the one or more processors are individually or collectively further operable to execute the code to cause the apparatus to:

determine a second time instance at which the one or more synchronization signal block bursts end transmission via the cell, the second time instance comprising a second time interval in which a channel state information report is transmitted, the channel state information report being based at least in part on an activation of the cell.

17. The apparatus of claim 1, wherein the one or more processors are individually or collectively further operable to execute the code to cause the apparatus to:

receive, after the first time instance, a third message indicating a termination of the one or more synchronization signal block bursts associated with the cell, wherein the one or more synchronization signal block bursts stop after the third message is received in accordance with the termination of the one or more synchronization signal block bursts, and wherein the third message is received form a primary cell or a secondary cell.

18. The apparatus of claim 1, wherein the first message or the second message, or both, are received from a primary cell or a secondary cell.

19. A method for wireless communications, comprising:

receiving a first message configuring on-demand transmission for one or more synchronization signal block bursts associated with a cell;

receiving a second message indicating transmission of the one or more synchronization signal block bursts associated with the cell;

determining, based at least in part on a time offset value, a first time instance that corresponds to a first synchronization signal block transmitted via the cell, the first synchronization signal block is included in a synchronization signal block burst of the one or more synchronization signal block bursts, wherein the time offset value comprises a quantity of time intervals after a first time interval during which the second message is received, and wherein the time offset value is based at least in part on a first value and at least one of a medium access control-control element processing time or a procedural delay value; and receiving the one or more synchronization signal block bursts via the cell in accordance with the second message, the first time instance, and the time offset value.

20. A non-transitory computer-readable medium storing code for wireless communications, the code comprising instructions executable by at least one processor to:

receive a first message configuring on-demand transmission for one or more synchronization signal block bursts associated with a cell;

receive a second message indicating transmission of the one or more synchronization signal block bursts associated with the cell;

determine, based at least in part on a time offset value, a first time instance that corresponds to a first synchronization signal block transmitted via the cell, the first synchronization signal block is included in a synchronization signal block burst of the one or more synchronization signal block bursts, wherein the time offset value comprises a quantity of time intervals after a first time interval during which the second message is received, and wherein the time offset value is based at least in part on a first value and at least one of a medium access control-control element processing time or a procedural delay value; and receive the one or more synchronization signal block bursts via the cell in accordance with the second message, the first time instance, and the time offset value.

* * * * *